United States Patent
Kawahara et al.

(10) Patent No.: US 7,391,935 B2
(45) Date of Patent: Jun. 24, 2008

(54) RETARDATION FILM, PROCESS FOR PRODUCING THE SAME, OPTICAL FILM, IMAGE DISPLAY, LIQUID CRYSTAL PANEL AND LIQUID CRYSTAL DISPLAY

(75) Inventors: Satoru Kawahara, Ibaraki (JP); Masaki Hayashi, Ibaraki (JP); Shuuji Yano, Ibaraki (JP); Kenji Yoda, Ibaraki (JP); Kentarou Kobayashi, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 1 day.

(21) Appl. No.: 11/491,255

(22) Filed: Jul. 24, 2006

(65) Prior Publication Data

US 2007/0177087 A1  Aug. 2, 2007

Related U.S. Application Data

(63) Continuation of application No. 11/195,724, filed on Aug. 3, 2005, now Pat. No. 7,215,839.

(30) Foreign Application Priority Data

Aug. 5, 2004  (JP)  .............................. 2004-229565
Apr. 21, 2005  (JP)  .............................. 2005-123874

(51) Int. Cl.
  *G02B 6/00*  (2006.01)
  *G02F 1/1335*  (2006.01)
(52) U.S. Cl. ........................... 385/11; 349/117; 349/149
(58) Field of Classification Search .................... 385/11, 385/39, 40–43, 130; 349/117, 141
See application file for complete search history.

(56) References Cited

U.S. PATENT DOCUMENTS 6,542,300 B2 * 4/2003 Umemoto .................... 359/491
6,958,797 B2  10/2005 Kawahara et al.
7,075,604 B2   7/2006 Yano et al.

(Continued)

FOREIGN PATENT DOCUMENTS

CN  1448734 A  10/2003

(Continued)

OTHER PUBLICATIONS

Japanese Office Action mailed Feb. 21, 2006 of corresponding JP Application No. 2005-123874.

(Continued)

*Primary Examiner*—M R C Cushwa
*Assistant Examiner*—Eric Wong
(74) *Attorney, Agent, or Firm*—Westerman, Hattori, Daniels & Adrian, LLP.

(57) ABSTRACT

A retardation film of the present invention comprises a stretched film of a polymer film containing a norbornene-based resin, wherein the stretched film satisfies the following equation (1) and the equation (2);

$$100 \text{ nm} \leq (n_x - n_y) \cdot d \leq 350 \text{ nm}, \qquad (1)$$

$$0.1 \leq (n_x - n_z)/(n_x - n_y) \leq 0.9, \qquad (2)$$

where the refractive indices in the slow axis direction, the fast axis direction and the thickness direction of the film are nx, ny and nz, respectively, d(nm) is thickness of the film, and the slow axis direction is a direction that the refractive index in film plane is maximum. The retardation film is hard to cause a shift or an unevenness of a retardation value due to a stress.

11 Claims, 6 Drawing Sheets

U.S. PATENT DOCUMENTS 7,128,952 B2 * 10/2006 Murakami et al. ........... 428/1.3
2005/0231839 A1 * 10/2005 Murakami et al. .......... 359/883

FOREIGN PATENT DOCUMENTS

| CN | 1480747 A | 3/2004 |
|---|---|---|
| JP | 2-160204 | 6/1990 |
| JP | 4-305602 | 10/1992 |
| JP | 5-157911 | 6/1993 |
| JP | H05-157911 A | 6/1993 |
| JP | H11-125716 A | 5/1999 |
| JP | 11-305217 | 11/1999 |
| JP | 2000-39610 | 2/2000 |
| JP | 2001-147325 A | 5/2001 |
| JP | 2003-332068 A | 11/2003 |

OTHER PUBLICATIONS

Office Action of Corresponding Chinese Patent Application No. 200510085960.3 issued Nov. 9, 2007.

* cited by examiner

RETARDATION FILM, PROCESS FOR PRODUCING THE SAME, OPTICAL FILM, IMAGE DISPLAY, LIQUID CRYSTAL PANEL AND LIQUID CRYSTAL DISPLAY

This application is a continuation of application Ser. No. 11/195,724 filed Aug. 3, 2005, now U.S. Pat. No. 7,215,839.

BACKGROUND OF THE INVENTION

1. Field of the invention

The present invention relates to a retardation film and a process for producing the same. The present invention also relates to an optical film as a combination of the retardation film and a polarizer or a polarizing plate. The retardation film and the optical film can be applied to an image display such as a liquid crystal display, an organic EL display, and PDP. In particular, the retardation film of the present invention is suitable for compensating for a viewing angle of a liquid crystal cell of TN mode, VA mode, IPS mode, FFS mode or OCB mode, and an optical film using the retardation film can be suitably applied to a liquid crystal panel, and a liquid crystal display.

2. Description of the Related Art

In a liquid crystal display, generally, a liquid crystal panel in which a polarizer is disposed on both sides of a liquid crystal cell is used. In addition, in the liquid crystal panel, in order to optically compensate for retardation due to birefringence of the liquid crystal cell in normal direction and in oblique direction, a retardation film is disposed between the liquid crystal cell and the polarizer. In order to improve display property of the liquid crystal display in oblique direction, how a retardation value of the retardation film varies relative to an angle in oblique direction is very important.

Then, a retardation film in which a retardation value is approximately constant not depending on an angle has been proposed (JP-A-2-160204). The retardation film shows a relationship of nx>nz>ny where the refractive indices in the slow axis direction, the fast axis direction and the thickness direction of the film to be nx, ny and nz, respectively. An optical film using such the retardation film and the polarizing plate, and the IPS mode or VA mode liquid crystal display in which the viewing angle property in oblique direction is improved using the retardation film have been also proposed (JP-A-11-305217, JP-A-2000-39610, and JP-A-4-305602).

As a process for producing a retardation film showing a relationship of nx>nz>ny, a process for producing the retardation film by adhering a shrinkable film to one side or both sides of a polymer film to give a laminate, and subjecting the laminate to heat-stretching treatment has been proposed (JP-A No. 5-157911). In this process, a refractive index distribution of the polymer film is made to greatly change before and after stretching. For this reason, as a polymer film to be used, a polymer film in which retardation is easily generated in a low stretching ratio is preferable and, usually, a polycarbonate-based resin, and an aromatic polymer film such as a polyallylate-based resin and a polysulfone-based resin have been used. However, since the aromatic polymer film has a large absolute value of photoelastic coefficient, retardation is easily changed relative to stress. For this reason, there is a problem that, when the film is exposed to a high temperature in the state where the film is arranged between the liquid crystal cell and the polarizer, a retardation value is shifted from a designed value due to a shrinking stress of the polarizer or, when it is used in the liquid crystal display, a unevenness of a retardation value is generated due to a unevenness of stress generated by heat of backlight, deteriorating display property. On the other hand, an aliphatic-based resin film such as a norbornene-based resin film has a small absolute value of photoelastic coefficient. In the aliphatic-based resin film, however, since retardation is generated with difficulty, a desired retardation value could not be obtained not only by stretching at a low stretching ratio as in an aromatic-based polymer film, but also at a high stretching ratio. In addition, when the film is stretched at a high stretching ratio, there is a problem that a film is broken.

SUMMARY OF THE INVENTION

The present invention was done in order to solve such problems, and an object of the present invention is to provide a retardation film having relationship of nx>nz>ny and in which it is hard to cause a shift or an unevenness of a retardation value due to a stress, and a process for producing the same.

Another object of the present invention is to provide an optical film as a combination of the retardation film and a polarizer, to provide a liquid crystal panel using the optical film, and to provide an image display such as a liquid crystal display using the retardation film or the optical film.

In order to solve the aforementioned problems, the present inventors intensively studied and, as a result, found out that the aforementioned objects can be attained by means of the following retardation film and a process for producing the same, which resulted in completion of the present invention.

That is, the present invention is related to a retardation film comprising a stretched film of a polymer film containing a norbornene-based resin, wherein
the stretched film satisfies the following equation (1) and the equation (2);

$$100 \text{ nm} \leq (nx-ny) \cdot d \leq 350 \text{ nm} \tag{1}$$

$$0.1 \leq (nx-nz)/(nx-ny) \leq 0.9 \tag{2}$$

where the refractive indices in the slow axis direction, the fast axis direction and the thickness direction of the film are nx, ny and nz, respectively, d(nm) is thickness of the film, and the slow axis direction is a direction that the refractive index in film plane is maximum.

In the above retardation film, an absolute value of photoelastic coefficient of the retardation film at 23° C. is preferably from $1.0 \times 10^{-12}$ m$^2$/N to $12.0 \times 10^{-12}$ m$^2$/N.

In the above retardation film, the norbornene-based resin is preferably a resin in which a ring opening polymer or copolymer obtained by polymerizing a norbornene-based monomer is hydrogenated.

The present invention is also related to a process for producing a retardation film described above, comprising steps of:

applying a shrinkable film on one side or both sides of a polymer film containing a norbornene-based resin, and
heat-stretching the polymer film so that the stretched film satisfies the following equation (1) and the equation (2);

$$100 \text{ nm} \leq (nx-ny) \cdot d \leq 350 \text{ nm} \tag{1}$$

$$0.1 \leq (nx-nz)/(nx-ny) \leq 0.9 \tag{2}$$

where the refractive indices in the slow axis direction, the fast axis direction and the thickness direction of the film are nx, ny and nz, respectively, d(nm) is thickness of the film, and the slow axis direction is a direction that the refractive index in film plane is maximum.

In the above process for producing a retardation film, a thickness of the polymer film is preferably from 10 to 500 μm.

In the above process for producing a retardation film, a stretching temperature of the polymer film is preferably from Tg+1° C. to Tg+30° C. of the polymer film.

In the above process for producing a retardation film, a stretching ratio of the polymer film is preferably from 1.05 to 3 times.

In the above process for producing a retardation film, the shrinkable film preferably has a shrinkage percentage in the machine direction at 140° C., which is expressed by $S^{140}$ (MD), of from 4 to 20%, and a shrinkage percentage in the transverse direction at 140° C., which is expressed by $S^{140}$ (TD), of from 4 to 30%.

In the above process for producing a retardation film, the shrinkable film preferably has a shrinkage percentage in the machine direction at 160° C., which is expressed by $S^{160}$ (MD), of from 10 to 30%, and a shrinkage percentage in the transverse direction at 160° C., which is expressed by $S^{160}$ (TD), of from 32 to 65%.

In the above process for producing a retardation film, a difference in the shrinkable film between a shrinkage percentage in the transverse direction at 140° C., which is expressed by $S^{140}$ (TD), and a shrinkage percentage in the machine direction at 140° C., which is expressed by $S^{140}$ (MD), that is expressed by $\Delta S^{140} = S^{140}$ (TD)$-S^{140}$ (MD) is preferably in a range of $0.5\% \leq \Delta S^{140} \leq 10\%$.

In the above process for producing a retardation film, a difference in the shrinkable film between a shrinkage percentage in the transverse direction at 160° C., which is expressed by $S^{160}$ (TD), and a shrinkage percentage in the machine direction at 160° C., which is expressed by $S^{160}$ (MD), that is expressed by $\Delta S^{160} = S^{160}$ (TD)$-S^{160}$ (MD) is preferably in a range of $5\% \leq \Delta S^{160} \leq 50\%$.

In the above process for producing a retardation film, the shrinkable film preferably has a shrinking stress in the transverse direction at 140° C., which is expressed by $T^{140}$ (TD), of from 0.2 to 1.2 N/2 mm.

In the above process for producing a retardation film, the shrinkable film preferably has a shrinking stress in the transverse direction at 150° C., which is expressed by $T^{150}$ (TD), of from 0.3 to 1.3 N/2 mm.

In the above process for producing a retardation film, the shrinkable film is preferably a biaxial stretched polypropylene film.

The present invention is also related to an optical film in which a retardation film described above is laminated on at least one side of a polarizer or a polarizing plate provided with a transparent protective on one side or both sides of a polarizer, wherein the slow axis of the retardation film is parallel or perpendicular to the absorption axis of the polarizer.

The present invention is also related to an optical film in which a retardation film described above is laminated on at least one side of a polarizing plate provided with a transparent protective film on one side or both sides of polarizer, wherein the slow axis of the retardation film is parallel or perpendicular to the absorption axis of the polarizer, the transparent protective film is arranged on at least one side of the polarizing plate on which the retardation film is laminated, and the transparent protective film satisfies the following equation (3) and equation (4);

$$0 \text{ nm} < (nx-ny) \cdot d \leq 5 \text{ nm} \quad (3)$$

$$0 \text{ nm} < (nx-nz) \cdot d \leq 15 \text{ nm} \quad (4)$$

where the refractive indices in the slow axis direction, the fast axis direction and the thickness direction of the film are nx, ny and nz, respectively, d(nm) is thickness of the film, and the slow axis direction is a direction that the refractive index in film plane is maximum.

The present invention is also related to an image display: comprising a retardation film described above or an optical film described above.

The present invention is also related to a liquid crystal panel: comprising a polarizer on both sides of a liquid crystal cell, wherein an optical film described above is disposed at least on one side of the liquid crystal cell.

In the above liquid crystal panel, the liquid crystal cell is preferably TN mode, VA mode, IPS mode, FFS mode or OCB mode.

The present invention is also related to a liquid crystal display: comprising the liquid crystal panel described above.

The present invention is also related to a liquid crystal television: comprising the liquid crystal panel described above.

The retardation film of the present invention is a stretched film of a polymer film containing a norbornene-based resin. Since the retardation film has a small absolute value of photoelastic coefficient, it is difficult to generate a shift or an unevenness of a retardation value by a stress even when used in the liquid crystal display. Although a retardation film having a relationship of nx>nz>ny has not been obtained by stretching of a polymer film containing a norbornene-based resin, a retardation film having a relationship of nx>nz>ny and satisfying the equation (1) and the equation (2) is obtained by applying a shrinkable film having a prescribed shrinkage percentage on one side or both sides of the polymer film, and heat-stretching this in the present invention. In addition, according to the process of the present invention, a retardation value can be adjusted in a wide range by stretching at a low stretching ratio also when a retardation film is produced by stretching a polymer film containing a norbornene-based resin.

DESCRIPTION OF THE PREFERRED EXAMPLES

Figure 1:
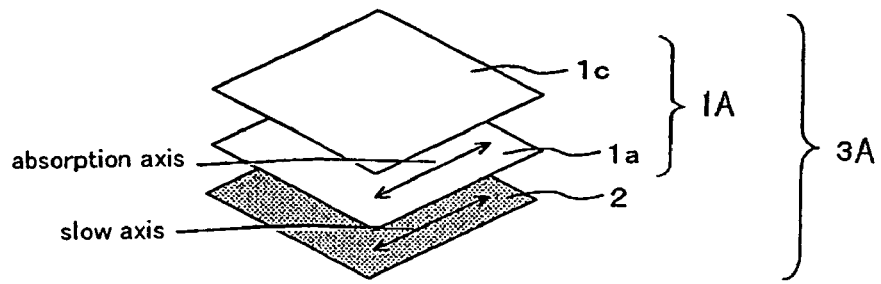
FIG. 1 is a schematic view showing one example of the polarizing plate of the present invention.

The retardation film of the present invention will be explained. As described above, the retardation film of the present invention is a stretched film of a polymer film containing a norbornene-based resin. As used herein, a norbornene-based resin refers to a polymer obtained by polymerizing a norbornene-based monomer having a norbornene ring in a part or all of a starting raw material as monomer. As to the norbornene-based resin, a compound having a norbornene ring, which is a norbornane ring having double bond, is used as a starting raw material monomer, but in the polymer or copolymer, a norbornane ring may be or not may be in constitutional units. Examples of the constitutional units of the norbornene-based resin having no norbornane ring include a compound which is converted into a 5-membered ring by cleavage, a representative of which is norbornene, dicyclopentadiene, 5-phenyl norbornene and a derivative thereof. In a case the norbornene-based resin is a copolymer, the arrangement state of the molecule is not particularly limited, but may be a random copolymer, a block copolymer, or a graft copolymer.

Examples of the norbornene-based resin include a ring opening polymer or copolymer obtained by polymerizing a norbornene-based monomer, a modified polymer such as a maleic acid adduct, and a cyclopentanediene adduct of the polymer or copolymer, and a resin obtained by hydrogenating them; a resin obtained by addition-polymerizing a norbornene-based monomer. The ring opening polymer or copolymers obtained by polymerizing a norbornene-based monomer further include a resin obtained by hydrogenating a ring opening copolymer of one or more norbornene-based monomers and α-olefins, cycloalkenes, and/or non-conjugated dienes. The resins obtained by addition-polymerizing or copolymerizing a norbornene-based monomer further include a resin obtained by addition-copolymerizing one or more norbornene-based monomers and α-olefins, cycloalkenes and/or non-conjugated dienes.

Preferably, the retardation film of the present invention is a stretched film of a polymer film containing a resin obtained by hydrogenating a ring opening polymer or copolymer obtained by polymerizing a norbornene-based monomer, because a retardation film which is excellent in molding processability, has high uniformity and has a large retardation value can be obtained.

More preferably, the retardation film of the present invention is a stretched film of a polymer in which a ring opening polymer or copolymer obtained by polymerizing a norbornene-based monomer, having a structure represented by the following general formula (I), the following general formula (II) and/or the following general formula (III), are hydrogenated in a part or all of its constitutional units.

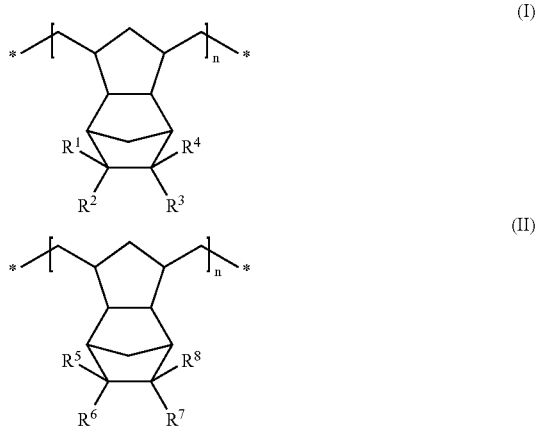

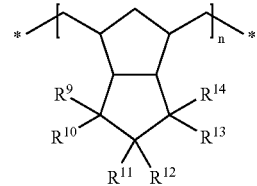

In the general formulas (I), (II) and (III), $R^1$ to $R^{14}$ are the same or different, and each is a substituent selected from a hydrogen atom, a halogen atom, a halogenated alkyl group, a C1-C4 alkyl group, a C1-C4 alkylidene group, a C1-C4 alkenyl group, a C1-C4 alkoxycarbonyl group, an aryl group, an aralkyl group, an aralkyloxy group, a hydroxyalkyl group, a cyano group, a C4-C10 cycloalkyl group, an acyloxy group, and a substituted derivative thereof, and n is an integer of 2 or more.

Particularly preferably, in the general formula (I), $R^1$ to $R^4$ are the same or different, and each is a substituent selected from a hydrogen atom, a halogen atom, a halogenated alkyl group, a C1-C4 alkyl group, a C1-C4 alkylidene group, a C1-C4 alkenyl group, a C1-C4 alkoxycarbonyl group, an aryl group, an aralkyl group, an aralkyloxy group, a C4-C10 cycloalkyl group and an acyloxy group, and n is an integer of 2 or more. In addition, particularly preferably, in the general formula (II), $R^5$ to $R^8$ are the same or different, and each is a substituent selected from a hydrogen atom, a halogen atom, a halogenated alkyl group, a C1-C4 alkyl group, a C1-C4 alkylidene group, a C1-C4 alkenyl group, and a C1-C4 alkoxycarbonyl group, and n is an integer of 2 or more. In addition, particularly preferably, in the general formula (III), $R^9$ to $R^{14}$ are the same or different, and each is a substituent selected from a hydrogen atom and a C1-C4 alkyl group, and n is an integer of 2 or more.

Most preferably, in the general formula (I), $R^1$ and $R^2$ are the same or different, and each is a substituent selected from a hydrogen atom, a trifluoromethyl group, a methyl group, an ethyl group, a methylidene group, an ethylidene group, a vinyl group, a propenyl group, a methoxycarbonyl group, an ethoxycarbonyl group, a phenyl group, an ethylphenyl group, a benzoyloxy group, and a cyclohexyl group; $R^3$ and $R^4$ are each a hydrogen atom; and n is an integer of 2 or more. In addition, most preferably, in the general formula (II), $R^5$ and $R^6$ are the same or different, and each is a substituent selected from a hydrogen atom, a trifluoromethyl group, a methyl group, an ethyl group, a methylidene group, an ethylidene group, a vinyl group, a propenyl group, a methoxycarbonyl group, and an ethoxycarbonyl group; $R^7$ and $R^8$ are each a hydrogen atom; and n is an integer of 2 or more. In addition, most preferably, in the general formula (III), $R^9$ to $R^{12}$ are the same or different, and each is a hydrogen atom and/or a methyl group. $R^{13}$ and $R^{14}$ is each a hydrogen atom; and n is an integer of 2 or more.

As the norbornene-based monomer, a suitable norbornene-based monomer can be appropriately selected from the conventionally known norbornene-based monomers. Examples of the norbornene-based monomer include bicyclo[2.2.1]-hept-2-ene (conventional name: norbornene), and derivatives thereof, for example, 5-methyl-bicyclo[2.2.1]-hept-2-ene, 5,5-dimethyl-bicyclo[2.2.1]-hept-2-ene, 5-ethyl-bicyclo[2.2.1]-hept-2-ene, 5-propyl-bicyclo[2.2.1]-hept-2-ene, 5-butyl-bicyclo[2.2.1]-hept-2-ene, 5-methylidene-bicyclo[2.2.1]-hept-2-ene, 5-ethylidene-bicyclo[2.2.1]-hept-2-ene, 5-vinyl-bicyclo[2.2.1]-hept-2-ene, 5-propenyl-bicyclo[2.2.1]-hept-2-ene, 5-methoxycarbonyl-bicyclo[2.2.1]-hept-2-ene, 5-ethoxycarbonyl-bicyclo[2.2.1]-hept-2-ene, 5-methyl-5-methoxycarbonyl-bicyclo[2.2.1]-hept-2-ene, 5-methyl-5-ethoxycarbonyl-bicyclo[2.2.1]-hept-2-ene, 5-phenyl-bicyclo[2.2.1]-hept-2-ene, 5-cyclohexyl-bicyclo[2.2.1]-hept-2-ene, 5-benzoyloxy-5-methylbicyclo[2.2.1]-hept-2-ene, 5-trifluoromethyl-bicyclo[2.2.1]-hept-2-ene, 5,6-bis(trifluoromethyl)-bicyclo[2.2.1]-hept-2-ene, 5-benzyl-bicyclo[2.2.1]-hept-2-ene, 5-tolyl-bicyclo[2.2.1]-hept-2-ene, 5-(ethylphenyl)-bicyclo[2.2.1]-hept-2-ene, 5-(isopropylphenyl)-bicyclo[2.2.1]-hept-2-ene, 5-cyano-bicyclo[2.2.1]-hept-2-ene, bicyclo[2.2.1]-hept-5-enyl-2-propionate, bicyclo[2.2.1]-hept-5-enyl-2-methyl octanate, bicyclo[2.2.1]-hept-5-ene-5,6-dicarboxylic acid dianhydride, and 5-hydroxymethyl-bicyclo[2.2.1]-hept-5-ene, and derivatives of these monomers having polar substitutions group such as halogen groups.

Other examples include tricyclo[4.3.1$^{2,5}$.0$^{1,6}$]-deca-3,7-diene (conventional name: dicyclopentadiene), and derivatives thereof, for example, tricyclo[4.3.1$^{2,5}$.0$^{1,6}$]-deca-3-ene, 2-methyl-tricyclo[4.3.1$^{2,5}$.0$^{1,6}$]-deca-3-ene, 5-methyl-tricyclo[4.3.1$^{2,5}$.0$^{1,6}$]-deca-3-ene, and derivatives of these monomers having polar substitutions group such as halogen groups.

Other examples include tricyclo[4.4.1$^{2,5}$.0$^{1,6}$]-undeca-3,7-diene, tricyclo[4.4.1$^{2,5}$.0$^{1,6}$]-undeca-3,8-diene, and a derivative thereof, for example, tricyclo[4.4.1$^{2,5}$.0$^{1,6}$]-undeca-3-ene, and derivatives of these monomers having polar substitutions group such as halogen groups.

Other examples include tetracyclo[4.4.1$^{2,5}$.1$^{7,10}$.0]-dodeca-3-ene (conventional name: tetracyclododecene), and derivatives thereof, for example, 8-methyl-tetracyclo[4.4.1$^{2,5}$.1$^{7,10}$.0]-dodeca-3-ene, 8-ethyl-tetracyclo[4.4.1$^{2,5}$.1$^{7,10}$.0]-dodeca-3-ene, 8-methylidene-tetracyclo[4.4.1$^{2,5}$.1$^{7,10}$.0]-dodeca-3-ene, 8-ethylidene-tetracyclo[4.4.1$^{2,5}$.1$^{7,10}$.0]-dodeca-3-ene, 8-vinyl-tetracyclo[4.4.1$^{2,5}$.1$^{7,10}$.0]-dodeca-3-ene, 8-propenyl-tetracyclo[4.4.1$^{2,5}$.1$^{7,10}$.0]-dodeca-3-ene, 8-methoxycarbonyl-tetracyclo[4.4.1$^{2,5}$.1$^{7,10}$.0]-dodeca-3-ene, 8-ethoxycarbonyl-tetracyclo[4.4.1$^{2,5}$.1$^{7,10}$.0]-dodeca-3-ene, 8-n-propoxycarbonyl-tetracyclo[4.4.1$^{2,5}$.1$^{7,10}$.0]-dodeca-3-ene, 8-butoxycarbonyl-tetracyclo[4.4.1$^{2,5}$.1$^{7,10}$.0]-dodeca-3-ene, 8-phenoxycarbonyl-tetracyclo[4.4.1$^{2,5}$.1$^{7,10}$.0]-dodeca-3-ene, 8-trifluoromethyl-tetracyclo[4.4.1$^{2,5}$.1$^{7,10}$.0]-dodeca-3-ene, 8-methyl-8-trifluoromethyl-tetracyclo[4.4.1$^{2,5}$.1$^{7,10}$.0]-dodeca-3-ene, 8-methyl-8-methoxycarbonyl-tetracyclo[4.4.1$^{2,5}$.1$^{7,10}$.0]-dodeca-3-ene, 8-methyl-8-ethoxycarbonyltetracyclo[4.4.1$^{2,5}$.1$^{7,10}$.0]-dodeca-3-ene, 8-methyl-8-n-propoxycarbonyltetracyclo[4.4.1$^{2,5}$.1$^{7,10}$.0]-dodeca-3-ene, 8-methyl-8-butoxycarbonyltetracyclo[4.4.1$^{2,5}$.1$^{7,10}$.0]-dodeca-3-ene, 8-methyl-8-phenoxycarbonyltetracyclo[4.4.1$^{2,5}$.1$^{7,10}$.0]-dodeca-3-ene, and derivatives of these monomers having polar substitutions group such as halogen groups. The aforementioned norbornene-based monomers may be used alone, or two or more kinds may be used by combining them. Alternatively, the aforementioned norbornene-based monomers may be used after appropriately modifying them arbitrarily.

Preferably, as the norbornene-based monomer, at least one norbornene-based monomer selected from 5-methyl-bicyclo[2.2.1]-hept-2-ene, 5-ethyl-bicyclo[2.2.1]-hept-2-ene, 5-methoxycarbonyl-bicyclo[2.2.1]-hept-2-ene, 5-methyl-5-methoxycarbonyl-bicyclo[2.2.1]-hept-2-ene, 5-phenyl-bicyclo[2.2.1]-hept-2-ene, tricyclo[4.3.1$^{2,5}$.0$^{1,6}$]-deca-3,7-diene, tricyclo[4.3.1$^{2,5}$.0$^{1,6}$]-deca-3-ene, tetracyclo[4.4.1$^{2,5}$.1$^{7,10}$.0]-dodeca-3-ene, 8-methyl-tetracyclo[4.4.1$^{2,5}$.1$^{7,10}$.0]-dodeca-3-ene, 8-methoxycarbonyl-tetracyclo[4.4.1$^{2,5}$.1$^{7,10}$.0]-dodeca-3-ene, and 8-methyl-8-methoxycarbonyltetracyclo[4.4.1$^{2,5}$.1$^{7,10}$.0]-dodeca-3-ene is used.

The α-olefins have preferably 2 to 20, more preferably 2 to 10, carbon atoms and the examples include ethylene, propylene, 1-butene, 3-methyl-1-butene, 1-pentene, 3-methyl-1-pentene, 4-methyl-1-pentene, 4,4-dimethyl-1-pentene, 1-hexene, 3-methyl-1-hexene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-eicocene, and etc. Among them, ethylene is particularly preferable. These α-olefins may be used alone, or two or more kinds may be used by combining them. If necessary, other vinyl-based monomer may be copolymerized in such a range that the objects of the present invention are not deteriorated.

Examples of the cycloalkenes include cyclobutene, cyclopentene, cyclohexene, 3-methyl-cyclohexene, 3,4-dimethyl-cyclohexene, 2-(2-methylbutyl)-1-cyclohexene, cycloheptene, cyclooctene, 6-bromo-3-chloro-4-methylcyclohexene, 3a,5,6,7a-tetrahydro-4,7-methano-1H-indene, and etc. These cycloalkenes may be used alone, or two or more kinds may be used by combining them. If necessary, other vinyl-based monomers may be copolymerized in such a range that the objects of the present invention are not deteriorated.

Examples of the non-conjugated dienes include 1,4-hexadiene, 4-methyl-1,4-hexadiene, 5-methyl-1,4-hexadiene, 1,7-octadiene, etc. These non-conjugated dienes can be used alone, or two or more kinds may be used by combining them. If necessary, other vinyl-based monomers may be copolymerized in such a range that the objects of the present invention are not deteriorated.

A resin in which the ring opening polymer or copolymer obtained by polymerizing a norbornene-based monomer is hydrogenated can be obtained by subjecting a norbornene-based monomer to a metathesis reaction to obtain a ring opening polymer or copolymer and, further, hydrogenating the ring opening polymer or copolymer. For example, the resin can be prepared by the method described in "Technique of Development-Application of Optical Polymer Materials", pp. 103-111 (published by NTS Publisher in 2003), the method described in JP-A-11-116780, from [0059] to [0060], the method described in JP-A-2001-350017, from [0035] to [0037], or the method described in JP-A-2005-008698, [0053].

Examples of a catalyst for ring opening polymerization used in the metathesis reaction include halides of a metal such as ruthenium, rhodium, palladium, osmium, iridium and platinum; polymerization catalysts containing a nitrate or an acetylacetone compound and a reducing agent; and polymerization catalysts containing a halide or an acetylacetone compound of a metal such as titanium, vanadium, zirconium, tungsten and molybdenum and an organic aluminum compound. Reaction conditions such as a polymerization temperature and a polymerization pressure can be appropriately selected depending on a kind of a norbornene-based monomer and a desired molecular weight and, usually, a range of a polymerization temperature is preferably −50° C. to 100° C., and a range of a polymerization pressure is preferably 0 to 50 kgf/cm$^2$.

The resin in which the ring opening polymer or copolymer obtained by polymerizing a norbornene-based monomer is hydrogenated can be obtained by a hydrogenating reaction which is performed by blowing hydrogen therein in the presence of the known hydrogenating catalyst. Examples of a hydrogenating catalyst include uniform system catalysts containing a combination of a transition metal compound/an alkyl metal compound such as cobalt acetate/triethylaluminum, nickel acetylacetonate/triisobutylaluminum, titanocene dichloride/N-butyllithium, zirconocene dichloride/sec-butyllithium, tetrabutoxytitanate/dimethylmagnesium; ununiform series metal catalysts such as nickel, palladium and platinum; ununiform series solid carrying catalysts in which a metal catalyst is carried by a carrier such as nickel/silica, nickel/diatomaceous earth, nickel/alumina, palladium/carbon, palladium/silica, palladium/diatomaceous earth, and palladium/alumina.

The resin in which the norbornene-based monomer is addition-polymer or copolymerized can be obtained by the method described, for example, in JP-A-61-292601.

A weight average molecular weight (Mw) of a norbornene-based resin used in the present invention is, as expressed by a value measured by a gel permeation chromatography (GPC) method using a toluene solvent, preferably in a range of 20,000 to 400,000, more preferably 30,000 to 300,000, particularly preferably 40,000 to 200,000, most preferably 40,000 to 80,000. When the weight average molecular weight is in the aforementioned range, an objective product excellent in a mechanical strength, and having excellent solubility, moldability, handling property of flow casting can be obtained.

When the norbornene-based resin is obtained by hydrogenating a ring opening polymer or copolymer obtained by polymerizing a norbornene-based monomer, a hydrogenation rate is usually 90% or higher, preferably 95% or higher, more preferably 99% or higher from a viewpoint of heat resistance deteriorating property and light resistance deteriorating property. The hydrogenation rate can be obtained, measuring $^1$H-NMR (500 MHz) of the resin, from a ratio of an integrated intensity of paraffin-based hydrogen and an integrated intensity of olefin-based hydrogen.

The retardation film of the present invention may be a stretched film of a polymer film containing two or more norbornene-based resins. Alternatively, the retardation film may be a stretched film of a polymer film containing the norbornene-based resin and other thermoplastic resin. A content of other thermoplastic resin is preferably more than 0 (ratio by weight) and not more than 50 (ratio by weight), more preferably more than 0 (ratio by weight) and not more than 40 (ratio by weight) relative to 100 of a total solid matter of the retardation film. By adopting the aforementioned range, the retardation film having a small absolute value of photoelastic coefficient, exhibiting excellent dispersion property, and having excellent durability, mechanical strength and transparency can be obtained.

As other thermoplastic resin, an appropriate resin can be appropriately selected depending on the purpose. Examples include general-use plastics such as a polyolefin resin, a polyvinyl chloride-based resin, a cellulose-based resin, a styrene-based resin, an acrylonitrile-butadiene-styrene-based resin, an acrylonitrile-styrene-based resin, polymethyl methacrylate, polyvinyl acetate, and a polyvinylidene chloride-based resin; general-use engineering plastics such as a polyamide-based resin, a polyacetal-based resin, a polycarbonate-based resin, a modified polyphenylene ether-based resin, a polybutylene terephthalate-based resin, and a polyethylene terephthalate-based resin; superengineering plastics such as a polyphenylene sulfide-based resin, a polysulfone-based resin, a polyether sulfone-based resin, a polyether ether ketone-based resin, a polyallylate-based resin, a liquid crystal resin, a polyamideimide-based resin, a polyimide-based resin, and a polytetrafluoroethylene-based resin. The aforementioned thermoplastic resins are used alone, or two or more kinds are used by combining them. Alternatively, the thermoplastic resin may be used after arbitrary appropriate polymer modification. Examples of the polymer modification include modification such as copolymerization, crosslinking, molecular terminal modification, and stereoregularity.

When the retardation film of the present invention is a stretched film of a polymer film containing the norbornene-based resin and other thermoplastic resin, other thermoplastic resin is preferably a styrene-based resin. The styrene-based resin is used for the purpose of adjusting dispersion property and an absolute value of photoelastic coefficient of the retardation film. As used herein, the "styrene-based resin" refers to a polymer obtained by polymerizing a styrene-based monomer. Examples of the styrene-based monomer include styrene, α-methyl styrene, o-methyl styrene, p-methyl styrene, p-chlorostyrene, p-nitrostyrene, p-aminostyrene, p-carboxystyrene, p-phenyl styrene, and 2,5-dichlorostyrene.

The styrene-based resin may be a copolymer obtained by reacting the styrene-based monomer and other monomers. Examples include a styrene-maleimide copolymer, a styrene-maleic anhydride copolymer, and a styrene-methyl methacrylate copolymer. When the styrene-based resin is a copolymer obtained by reacting the styrene-based monomer and two or more other monomers, a content of the styrene-based monomer is preferably not less than 50 (mol %) and less than 100 (mol %), more preferably not less than 60 (mol %) and less than 100 (mol %), most preferably not less than 70 (mol %) and less than 100 (mol %). When the content is in the aforementioned range, a retardation film having a small absolute value of photoelastic coefficient and excellent dispersion property can be obtained.

The styrene-based resin has a weight average molecular weight (Mw) measured by a gel-permeation-chromatography (GPC) method using a tetrahydrofuran solvent of preferably in a range of 1,000 to 400,000, more preferably 2,000 to 300,000. When the weight average molecular weight is in the aforementioned range, an objective product having excellent solubility and moldability can be obtained.

The polymer film containing a norbornene-based resin can be obtained by a casting method from a solution or a melt extruding method which is generally used. As a norbornene-based resin for forming the polymer film, the resin alone may be used, or two or more kinds may be used by mixing them. When resins are used by mixing them, a method of mixing them is not particularly limited, but when a film is prepared using a casting method, mixing components are stirred and mixed with a solvent at a prescribed ratio, which can be used as a uniform solution. In addition, in a case a film is prepared using a melt extruding method, both can be used by melt-mixing them at a prescribed ratio. In order to enhance smoothness of the resulting retardation film and obtain excellent optical uniformity, a casting method using a solution is preferably used.

Examples of a solvent used in the casting method include aromatic hydrocarbons such as benzene, toluene, xylene, methoxybenzene, and 1,2-dimethoxybenzene; halogenated hydrocarbons such as chloroform, dichloromethane, carbon tetrachloride, dichloroethane, tetrachloroethane, trichloroethylene, tetrachloroethylene, chlorobenzene, and ortho-dichlorobenzene; phenols such as phenol, and para-chlorophenol; ethers such as diethyl ether, dibutyl ether, tetrahydrofuran, anisole, and dioxane; ketones such as acetone, methyl isobutyl ketone, methyl ethyl ketone, cyclohexanone, cyclopentanone, 2-pentanone, 3-pentanone, 2-hexanone, 3-hexanone, 2-heptanone, 3-heptanone, 4-heptanone, 2,6-dimethyl-4-heptanone, 2-pyrrolidone, and N-methyl-2-pyrrolidone; alcohols such as n-butanol, 2-butanol, cyclohexanol, isopropyl alcohol, t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol; amides such as dimethylformamide, and dimethylacetamide; nitriles such as acetonitrile, and butyronitrile; cellosolves such as methyl cellosolve, and methyl cellosolve acetate; esters such as ethyl acetate, butyl acetate, and methyl lactate, and methylene chloride, carbon disulfide, ethyl cellosolve, and butyl cellosolve, being not limiting.

As the solvent, toluene, xylene, ethylbenzene, chlorobenzene, trimethylbenzene, diethylbenzene, isopropylbenzene, and chlorobenzene are preferable. More preferably, xylene, ethylbenzene and chlorobenzene are used in that solubility and stability of dope. These may be used alone, or two or more kinds may be used by mixing them.

A concentration of a total solid matter of a solution used in the casting method varies depending on solubility of a resin, a coating viscosity, wettability onto a substrate, and thickness after coating and, in order to obtain a polymer film having high smoothness, a solid matter is preferably dissolved at 2 to 100 parts by weight, more preferably 4 to 50 parts by weight, particularly 5 to 30 parts by weight relative to 100 parts by weight of a solvent.

The polymer film may contain other component such as a remaining solvent, a stabilizer, a plasticizer, an antioxidant, an antistatic agent, and an ultraviolet-ray absorbing agent, if necessary, in such a range that the object of the present invention is not deteriorated. In addition, in order to lessen a surface roughness, a leveling agent may be added.

As the leveling agent, a coating leveling agent such as a fluorine-based nonionic surfactant, a special acrylic resin-based leveling agent, and a silicone-based leveling agent can be used. Among them, a leveling agent having excellent compatibility with a solvent is preferable. An amount thereof is preferably not more than 0.005 part by weight, more preferably from 0.0001 to 0.005 part, further preferably 0.0005 to 0.003 part by weight by weight relative to 100 parts by weight of a solid matter of a norbornene-based resin.

A range of thickness of the polymer film can be selected depending on a designed retardation value, stretchability, and easiness of generation of a retardation value and 10 to 500 μm thick is preferably used. More preferable is 20 to 300 μm thick. When the thickness is in the aforementioned range, a film having sufficient self supporting property is obtained, and a wide range of a retardation value can be obtained.

A light transmittance of the polymer film is preferably 80% or more, more preferably 85% or more, particularly preferably 90% or more at wavelength of 590 nm. It is preferable that the resulting retardation film has a similar light transmittance.

A glass transition temperature (Tg) of the polymer film is not particularly limited, but from 110 to 185° C. is preferable. When Tg is 110° C. or more, a film having high durability is easily obtained and, when Tg is 185° C. or less, a retardation value in film plane and in a direction of thickness is easily controlled by stretching. Tg is more preferably from 120 to 170° C., particularly preferably from 135 to 160° C. A glass transition temperature (Tg) is a value obtained by a DSC method according to JIS K 7121.

The retardation film of the present invention is a stretched film of a polymer film containing the norbornene-based resin, and satisfies the following equation (1) and the following equation (2).

$$100 \text{ nm} \leq (nx-ny) \cdot d \leq 350 \text{ nm} \tag{1}$$

$$0.1 \leq (nx-nz)/(nx-ny) \leq 0.9 \tag{2}$$

where the refractive indices in the slow axis direction, fast axis direction and the thickness direction of the film are nx, ny and nz, respectively, and d (nm) is thickness of the film. The slow axis direction is a direction that the refractive index in film plane is maximum.

The retardation film having a range of thickness of from 100 to 500 μm is preferably used. The thickness is more preferably from 20 to 300 μm. When the thickness is in the aforementioned range, sufficient self supporting property of a film is obtained, and a wide range of a retardation value can be obtained.

The equation (1) indicates a range of a retardation value: Re(590) in film plane to light at wavelength 590 nm, and Re(590)=(nx−ny)×d. That is, the retardation film of the present invention satisfies 100 nm≦Re(590)≦350 nm.

When a retardation film is used as a λ/2 plate, preferable Re(590) is 200 nm<Re(590)≦350 nm, more preferably 240 nm≦Re(590)≦300 nm, particularly preferably 260 nm≦Re(590)≦280 nm, most preferably 265 nm≦Re(590)≦275 nm. By adjusting a value of the Re(590) to about ½ of the measuring wavelength, a display property of liquid crystal display can be further improved.

When a retardation film is used as a λ/2 plate, a range of thickness thereof is preferably from 80 to 160 μm, more preferably from 85 to 145 μm, more preferably from 95 to 135 μm.

When a retardation film is used as a λ/4 plate, preferable Re(590) is 100 nm<Re(590)≦200 nm, more preferably 120 nm≦Re(590)≦160 nm, particularly preferably 130 nm≦Re(590)≦150 nm, most preferably 135 nm≦Re(590)≦145 nm. By adjusting a value of the Re(590) to about ¼ of the measuring wavelength, a display property of liquid crystal display can be further improved.

When a retardation film is used as a λ/4 plate, a range of thickness thereof is preferably from 25 to 75 μm, more preferably from 35 to 65 μm.

It is preferable that a retardation value: Rth(590) in the thickness direction to light at wavelength 590 nm of the retardation film is 35 nm≦Rth(590)≦190 nm. A retardation value: Rth(590) in the thickness direction is expressed by Rth(590)=(nx−nz)×d.

When a retardation film is used as a λ/2 plate, preferable Rth(590) is 90 nm≦Re(590)≦190 nm, more preferably 100 nm≦Re(590)≦165 nm, particularly preferably 120 nm≦Re(590)≦155 nm.

When the retardation film is used as a λ/4 plate, Rth(590) is preferably 45 nm≦Re(590)≦110 nm, more preferably 50 nm≦Re(590)≦85 nm, particularly preferably 60 nm≦Re(590)≦80 nm.

As a method of calculating Rth, Rth can be obtained from results of measurement of a retardation value, an angle of the slow axis (orientation angle) and a refractive index using, for example, trade name "KOBRA21-ADH" manufactured by Oji Scientific Instruments. Using a retardation value (Re) in film plane, a retardation value (R40) measured when inclined at 40 degree relative to the slow axis as an inclined axis (R40), thickness (d) of a retardation film and an average refractive index (n0) of a retardation film, nx, ny and nz were obtained by computer numerical value calculation from the following equations (i) to (iii), and Rth was calculated by the equation (iv). Herein, φ and ny' are shown by the following equations (v) and (vi), respectively.

$$Re = (nx-ny) \times d \tag{i}$$

$$R40 = (nx-ny') \times d/\cos(\phi) \tag{ii}$$

$$(nx+ny+nz)/3 = n0 \tag{iii}$$

$$Rth = (nx-nz) \times d \tag{iv}$$

$$\phi = \sin^{-1}[\sin(40°)/n0] \tag{v}$$

$$ny' = ny \times nz/[ny^2 \times \sin^2(\phi) + nz^2 \times \cos^2(\phi)]^{1/2} \tag{vi}$$

In addition, in the retardation film, as expressed by the equation (2), a ratio (also referred to as Nz coefficient) of a retardation value: Rth(590) in the thickness direction measured with light at wavelength of 590 nm, and a retardation value in film plane: Re(590) is 0.1≦Nz≦0.9. Nz is expressed by Nz=Rth/Re=(nx−nz)/(nx−ny). Nz is more preferably 0.2≦Nz≦0.8, further preferably 0.3≦Nz≦0.7, particularly preferably 0.4≦Nz≦0.6, most preferably 0.45≦Nz≦0.55. By adjusting a value of a Nz coefficient of the retardation film to 0.5, a property in which a retardation value is approximately constant not depending on an angle can be attained, and a display property of liquid crystal display can be further improved.

Generally, an optical film becomes to show birefringence, if the optical film is applied by an external force and has a generated interior stress and temporary exhibits optical anisotropy. This phenomenon refers to photoelastic effect. When the photoelastic coefficient used as an index thereof has a smaller absolute value, optical uniformity is excellent, and an unevenness of retardation due to strain is caused with difficulty, being preferable. The absolute value of photoelastic coefficient can be calculated from a slope of a function of a retardation value and a stress by measuring a retardation value in film plane while applying a stress on a 2 cm×10 cm test piece at 23° C., using product name: Photometric Ellipsometer "M-220" manufactured by JASCO Corporation.

An absolute value of photoelastic coefficient of the retardation film is such that an absolute value: C value ($m^2/N$) of a value measured at wavelength of 590 nm is preferably in a range of $1.0 \times 10^{-12} \leq C \leq 12.0 \times 10^{-12}$, more preferably $1.0 \times 10^{-12} \leq C \leq 9.0 \times 10^{-12}$, further preferably $1.5 \times 10^{-12} \leq C \leq 7.0 \times 10^{-12}$, particularly preferably $2.0 \times 10^{-12} \leq C \leq 6.0 \times 10^{-12}$. In the aforementioned range, it is hard to cause a shift or an unevenness of a retardation value due to a shrinking stress of a polarizer and heat of backlight, and a retardation film having a relationship of nx>nz>ny can be obtained.

As dispersion property of the retardation film of the present invention, property in which a D (Re) value calculated by the following equation (5):

$$D(Re) = Re(480)/Re(590) \quad (5)$$

[where Re(480) and Re(590) are a retardation value in film plane to light at wavelengths of 480 nm and 590 nm, respectively] is preferably in a range of $0.85 \leq D(Re) \leq 1.20$. A range of a D (Re) value is preferably $0.90 \leq D(Re) \leq 1.10$, more preferably $0.95 \leq D(Re) \leq 1.05$. Since as the D (Re) value is smaller in the aforementioned range, a retardation value becomes constant in a wide range of visible region, a contrast ratio and color shift of a liquid crystal panel can be improved.

Since if an angle of the slow axis (also referred to as orientation angle) of the retardation film has a large variation, a polarization degree is lowered when the retardation film is laminated on a polarizer or a polarizing plate, a smaller variation of the orientation angle is better. Preferably, a range of a variation of an orientation angle at five measurement places arranged in a film transverse direction at an equal interval is preferably from ±2° to ±1°, more preferably from ±1° to ±0.5°.

Then, a process for producing the retardation film of the present invention will be explained. A process for producing the retardation film of the present invention is performed by applying a shrinkable film on one side or both sides of a polymer film containing a norbornene-based resin, and heat-stretching this.

Figure 14:
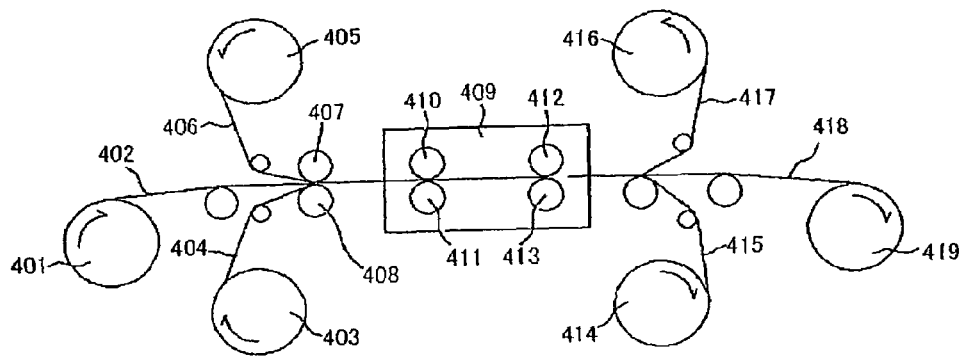
FIG. 14 is one example of a schematic view showing a process for producing a retardation film of the present invention.

One example of a process for producing the retardation film of the present invention will be explained by referring to FIG. 14. FIG. 14 is a schematic view showing a concept of a representative step of preparing the retardation film of the present invention. For example, a polymer film 402 containing a norbornene-based resin is delivered from a first delivering part 401, and a shrinkable film 404 provided with a pressure-sensitive adhesive layer delivered from a second delivering part 403, and a shrinkable film 406 provided with a pressure-sensitive adhesive layer delivered from a third delivering part 405 are applied on both sides of the polymer film 402 with a laminating roll 407, 408. A laminate in which a shrinkable film is applied on both sides of a polymer film 402 is subjected to stretching treatment while retaining at a constant temperature by a heating means 409, and while giving a tensile force in the machine direction of a film with rolls 410, 411, 412 and 413 having different rate ratios (and, at the same time, giving a tensile force in the thickness direction by a shrinkable film). At a first winding up part 414 and a second winding up part 416, a shrinkable film 415, 417 together with a pressure-sensitive adhesive layer is peeled from a stretched film, and the resulting retardation film 418 is wound up with a third winding up part 419.

As described above, the polymer film having thickness of from 10 to 500 µm is preferably used, and it is preferable to select thickness depending on a designed retardation value. When a retardation film is used as a λ/2 plate, a range of thickness thereof is preferably from 70 to 150 µm, more preferably from 70 to 130 µm, particularly preferably from 80 to 120 µm. When a retardation film is used as a λ/4 plate, a range of thickness thereof is preferably from 20 to 60 µm, more preferably from 30 to 50 µm.

The shrinkable film is used for imparting a contractile force in a direction perpendicular to a stretching direction at heat-stretching. Examples of a material used in the shrinkable film include polyester, polystyrene, polyethylene, polypropylene, polyvinyl chloride, and polyvinylidene chloride, being not limiting. A polypropylene film is preferably used in that shrinkage uniformity and heat resistance are excellent.

The shrinkable film is preferably a stretched film such as a biaxial stretched film and a uniaxial stretched film. The shrinkable film can be obtained, for example, by stretching an unstretched film which has been molded into a sheet by an extruding method at a prescribed stretching ratio in a machine and/or transverse direction with a simultaneous biaxial stretching machine. Molding and stretching conditions can be appropriately selected depending on a composition and a kind of a resin to be used, and the purpose. A biaxial stretched polypropylene film is particularly preferably used in that shrinkage uniformity and heat resistance are preferable.

The shrinkable film is such that, preferably, a shrinkage percentage in a film machine direction at 140° C., which is expressed by $S^{140}(MD)$, is from 4 to 20%, and a shrinkage percentage in the transverse direction at 140° C., which is expressed by $S^{140}(TD)$, is from 4 to 30%, more preferably, $S^{140}(MD)$ is from 5 to 10%, and $S^{140}(TD)$ is from 7 to 25%, further preferably $S^{140}(MD)$ is from 6 to 10%, and $S^{140}(TD)$ is from 10 to 25%, most preferably, $S^{140}(MD)$ is from 6 to 8%, and $S^{140}(TD)$ is from 10 to 20%. The shrinkage percentage can be obtained by the method described in Examples.

In addition, the shrinkable film is such that, preferably, a shrinkage percentage in a film machine direction at 160° C., which is expressed by $S^{160}(MD)$, is from 10 to 30%, and a shrinkage percentage in the transverse direction at 160° C., which is expressed by $S^{160}(TD)$, is from 32 to 65%, further preferably, $S^{160}(MD)$ is from 13 to 25%, and $S^{160}(TD)$ is from 34 to 60%, particularly preferably $S^{160}(MD)$ is from 15 to 23%, and $S^{160}(TD)$ is from 38 to 58%, most preferably, $S^{160}(MD)$ is from 17 to 21%, and $S^{160}(TD)$ is from 40 to 52%. The shrinkage percentage can be obtained by the method described in Examples.

The shrinkable film is such that a difference in the shrinkable film between a shrinkage percentage in the transverse direction at 140° C. and a shrinkage percentage in the machine direction at 140° C., that is expressed by $\Delta S^{140} = S^{140}(TD) - S^{140}(MD)$ is preferably in a range of $0.5\% \leq \Delta S^{140} \leq 10\%$, more preferably $1\% \leq \Delta S^{140} \leq 10\%$, further preferably $2\% \leq \Delta S^{140} \leq 10\%$, particularly preferably $4\% \leq \Delta S^{140} \leq 10\%$, most preferably $6\% \leq \Delta S^{140} \leq 10\%$. When a shrinkage percentage in MD direction is large, in addition to a stretching tensile force, a contractile force of the shrinkable film is applied to a stretching machine, and uniform stretching becomes difficult. When the difference is in the aforementioned range, uniform stretching can be performed without giving excessive load on facilities such as a stretching machine.

In addition, the shrinkable film is such that a difference in the shrinkable film between a shrinkage percentage in the transverse direction at 160° C. and a shrinkage percentage in the machine direction at 160° C., that is expressed by $\Delta S^{160}=S^{160}(TD)-S^{160}(MD)$ is preferably in a range of $5\% \leqq \Delta S^{160} \leqq 50\%$, more preferably $10\% \leqq \Delta S^{160} \leqq 45\%$, further preferably $18\% \leqq \Delta S^{160} \leqq 40\%$, particularly preferably $20\% \leqq \Delta S^{160} \leqq 35\%$, most preferably $25\% \leqq \Delta S^{160} \leqq 35\%$. When a shrinkage percentage in MD direction is large, in addition to a stretching tensile force, a contractile force of the shrinkable film is applied to a stretching machine, and uniform stretching becomes difficult. When the difference is in the aforementioned range, uniform stretching can be performed without giving excessive load on facilities such as a stretching machine.

The shrinkable film is such that a shrinking stress in the transverse direction at 140° C., which is expressed by $T^{140}$(TD), is preferably in a range of from 0.2 to 1.2 N/2 mm, more preferably, the $T^{140}$(TD) is from 0.35 to 1.1 N/2 mm, particularly preferably from 0.4 to 1 N/2 mm, most preferably from 0.6 to 0.9 N/2 mm.

In addition, the shrinkable film is such that a shrinking stress in the transverse direction at 150° C., which is expressed by $T^{150}$ (TD), is preferably in a range of from 0.3 to 1.3 N/2 mm, more preferably, the $T^{150}$(TD) is from 0.4 to 1.2 N/2 mm, particularly preferably from 0.5 to 1.1 N/2 mm, most preferably from 0.7 to 1 N/2 mm. When the stress is in the aforementioned range, a desired retardation value is obtained, and uniform stretching can be performed.

A range of a preferable thickness of the shrinkable film can be selected depending on the shrinkage percentage, and a designed retardation value, and for example, is preferably from 10 to 500 μm, more preferably from 20 to 300 μm, particularly preferably from 30 to 100 μm, most preferably from 40 to 80 μm. When the thickness is in the aforementioned range, a sufficient shrinkage percentage is obtained, and a retardation film having excellent optical uniformity can be prepared.

As the shrinkable film, a commercially available shrinkable film which is used in utility such as general packaging, food packaging, palette packaging, shrinking label, cap seal, and electrical insulation can be used by appropriate selection, as far as it satisfies the object of the present invention. The commercially available shrinkable film may be used as it is, or may be used after the film is subjected to secondary processing such as stretching treatment and shrinking treatment. Examples of the commercially available shrinkable film include trade name "Arphane Series" manufactured by Oji Paper Co., Ltd., trade name "FancyTop Series" manufactured by Gunze Ltd., trade name "Trephane series manufactured by Toray Industries, Inc., trade name "Sun Tox-OP Series" of Sun Tox Co., LTD., and trade name "Tocello OP Series" of Tocello.

A method of applying the shrinkable film on the polymer film is performed so that a shrinking direction of the shrinkable film includes a direction perpendicular to at least stretching direction. That is, the method is performed so that all or a part of a contractile force of the shrinkable film exerts in a direction perpendicular to a stretching direction of the polymer film. Therefore, a shrinking direction of the shrinkable film may be inclined relative to a stretching direction of the polymer film, and does not necessarily need to be in a completely perpendicular direction.

A method of applying the shrinkable film is not particularly limited, but a method of adhesion by providing a pressure-sensitive adhesive layer between the polymer film and the shrinkable film is preferable in that productivity is excellent. The pressure-sensitive adhesive layer can be formed on one or both of the polymer film or the shrinkable film. Usually, since the shrinkable film is peeled after the retardation film is prepared, as the pressure-sensitive adhesive, a pressure-sensitive adhesive which is excellent in adhesive strength and heat resistance in a heat-stretching step, and can be easily peeled at a peeling step thereafter, and in which a pressure-sensitive adhesive does not remain on a surface of the retardation film, is preferable. It is preferable that the pressure-sensitive adhesive layer is arranged on the shrinkable film in that release property is excellent.

As a pressure-sensitive adhesive forming the pressure-sensitive adhesive layer, an acrylic resin series, a synthetic rubber series, a rubber series and a silicone series are used. An acryl-based pressure-sensitive adhesive comprising an acryl-based polymer as a base polymer is preferable in that it is excellent in adhesive strength, heat resistance and release property. A weight average molecular weight (Mw) of the acryl-based polymer, in which calculated by a GPC method as expressed by polystyrene conversion measured by a GPC method, is preferably 30,000 to 2,500,000.

As a monomer used in the acrylic resin-based polymer, various alkyl (meth)acrylates can be used. Examples include (meth)acrylic acid alkyl esters (e.g. alkyl esters having 1 to 20 carbon atoms such as methyl ester, ethyl ester, propyl ester, butyl ester, 2-ethylhexyl ester, isooctyl ester, isononyl ester, isodecyl ester, dodecyl ester, lauryl ester, tridecyl ester, pentadecyl ester, hexadecyl ester, heptadecyl ester, octadecyl ester, nonadecyl ester, and eicosyl ester), and these can be used alone or in a combination of them.

In addition, in order to impart polarity to the resulting acrylic resin-based polymer, a carboxyl group-containing monomer such as (meth)acrylic acid and itaconic acid; a hydroxyl group-containing monomer such as hydroxyethyl (meth)acrylate, and hydroxypropyl (meth)acrylate; an amido group-containing monomer such as N-methylolacrylamide; a cyano group-containing monomer such as (meth)acrylonitrile; an epoxy group-containing monomer such as glycidyl (meth)acrylate; vinyl esters such as vinyl acetate; a styrene-based monomer such as styrene, and α-methylstyrene together with the aforementioned (meth)acrylic acid alkyl ester can be used as a copolymerization monomer.

In addition, a method of polymerizing the acrylic resin-based polymer is not particularly limited, but the known polymerization method such as solution polymerization, emulsion polymerization, suspension polymerization, and UV polymerization can be adopted.

In addition, the pressure-sensitive adhesive can contain a crosslinking agent. Examples of the crosslinking agent include a polyisocyanate compound, a polyamine compound, a melamine resin, a urea resin, and an epoxy resin. Further, if necessary, a tackifier, a plasticizer, a filler, an antioxidant agent, a ultraviolet-ray absorbing agent, and a silane coupling agent may be appropriately used in the pressure-sensitive adhesive agent.

A method of forming the pressure-sensitive adhesive layer is not particularly limited, but examples include a method of coating a pressure-sensitive adhesive on a releasing film, drying this, and transferring this onto the polymer film that is transferring method, and a method of directly coating a pressure-sensitive adhesive on the polymer film, and drying this that is direct transferring method.

A preferable thickness range of the pressure-sensitive adhesive layer is not particularly limited, but is appropriately determined depending on a pressure-sensitive adhesive strength and the surface state of the retardation film. For example, the range is preferably from 1 to 100 μm, further preferably from 5 to 50 μm, particularly preferably from 10 to 30 μm. When the thickness is in the aforementioned range, a sufficient shrinkage percentage is obtained, and a retardation film having excellent optical uniformity can be prepared. As the pressure-sensitive adhesive layer, pressure-sensitive adhesive layers having difference compositions or different kinds may be used by laminating them. In addition, if necessary, natural or synthetic resins such as a tackifier for the purpose of controlling an adhesive strength, and appropriate additives such as an antioxidant can be incorporated into the pressure-sensitive adhesive layer.

An exposed surface of the pressure-sensitive adhesive layer is covered with provisionally applying a releasing paper or a releasing film (also referred to as separator) until practical use, for the purpose of preventing its stain. Thereby, contact with a pressure-sensitive adhesive layer in the conventional handling state can be prevented. As the separator, for example, an appropriate separator as usual such as a separator obtained by coating-treating an appropriate thin film such as a plastic film, a rubber sheet, a paper sheet, a fabric, a non-woven fabric, a net, an foamed sheet, a metal foil, and a laminate thereof with an appropriate releasing agent such as a silicone series, a long chain alkyl series, a fluorine series and molybdenum sulfide can be used.

An adhesive strength at an interface at 23° C. between the polymer film and a pressure-sensitive adhesive layer is not particularly limited, but is preferably from 0.1 to 10 N/50 mm, more preferably from 0.1 to 5 N/50 mm, particularly preferably from 0.2 to 3 N/50 mm. The adhesive strength can be measured by pressing the aforementioned shrinkable film on the polymer film by three reciprocations with a manual roller according to JIS Z 0237 to obtain a sample for measuring an adhesive strength, the sample being subject to autoclave-treating (50° C., 15 min, 5 kg/cm$^2$), and measuring the adhesive strength with an apparatus according to JIS B 7721 by a 90 degree separating method (lifting rate: 300 mm/min) according to JIS Z 0237. The aforementioned adhesive strength can be attained by performing one or more kinds of appropriate systems such as a system of subjecting a surface on which a pressure-sensitive adhesive layer of the polymer film is set to appropriate treatment such as corona treatment and plasma treatment to control an adhesive strength with a pressure-sensitive adhesive layer, and a system of performing appropriate treatment such as heat treatment and autoclave treatment to control an adhesive strength in the state where the polymer film and the shrinkable film are adhered.

The shrinkable film can be adhered on one side or both sides of the polymer film at an appropriate number such as one or more depending on a designed contractile force. When the film is adhered to both sides, or a plurality of films are adhered to one side, shrinkage percentages of shrinkable films on a surface and a back, or at an upper position and a lower position may be the same or different.

A method of performing the aforementioned heat-stretching in the present invention is not particularly limited, but the previously known stretching treatment method can be used as far as it is a method which can impart a tensile force in a stretching direction of the polymer film, and a contractile force in a direction perpendicular to the stretching direction. Examples thereof include a longitudinal uniaxial stretching method, a transverse uniaxial stretching method, a longitudinal and transverse simultaneous biaxial stretching method, and a longitudinal and transverse sequential biaxial stretching method. The stretching treatment method can be performed by using an appropriate stretching machine such as a roll stretching machine, a tenter and a biaxial stretching machine. The heat-stretching may be performed by dividing into two or more times steps. A direction of stretching the polymer film may be a film machine direction (MD direction), or transverse direction (TD) direction. Alternatively, the direction may be a diagonal direction using a stretching method described in FIG. 1 of JP-A-2003-262721.

A temperature at which the retardation film is heat-stretched (also referred to as stretching temperature) is preferably not lower than a glass transition temperature (Tg) of the polymer film in that a retardation value of the retardation film easily becomes uniform, and hard to crystallize or whiten a film. The stretching temperature is preferably Tg+1° C. to Tg+30° C. of the polymer film, more preferably Tg+2° C. to Tg+20° C., further preferably Tg+3° C. to Tg+15° C., particularly preferably Tg+5° C. to Tg+10° C. When a stretching temperature is in the aforementioned range, uniform heat-stretching can be performed. When the stretching temperature is constant in a film transverse direction, a retardation film having excellent optical uniformity and having a small unevenness of a retardation value can be prepared.

A specific method of retaining the stretching temperature constant is not particularly limited, but examples include the known heating or cooling method, and temperature controlling method using a heater utilizing the hot air or the cold air, a microwave or far infrared-ray, and a roll, a heat pipe roll and a metal belt which are heated or cooled for temperature control.

When the stretching temperature varies widely, a stretching unevenness becomes large, leading to an unevenness of a retardation value of the finally obtained retardation film. Therefore, a smaller variation of temperatures in a film transverse direction is preferable. It is desirable that a temperature variation in plane direction is preferably in a range of ±1° C. or less.

A stretching ratio at the heat-stretching is determined by a polymer film to be used, a kind of a volatile component, a remaining amount of a volatile component, and a designed retardation value, being not limiting. For example, the stretching ratio is preferably from 1.05 to 3-fold times, more preferably from 1.1 to 2.5 times, particularly preferably from 1.1 to 2 times, and most preferably from 1.2 to 1.8 times. A supplying rate at stretching is not particularly limited, but is preferably 0.5 m/min or higher, more preferably 1 m/min or higher from a viewpoint of a machine precision and stability of a stretching apparatus.

The retardation film of the present invention to be used has a retardation value in which designed to be a prescribed retardation value in plane: Re, such as a λ/2 plate and a λ/4 plate. One retardation film of the present invention may be used, or two or more retardation films of the present invention are laminated at an arbitrary angle, which may be used. Alternatively, as the retardation film of the present invention, the retardation film combined with other retardation film may be used. Also when combined with other retardation film, one or more retardation films of the present invention can be used. One or more other retardation films may be used. Retardation films can be laminated with a pressure-sensitive adhesive or an adhesive.

Examples of the material of the aforementioned other retardation film include a polyester-based resin such as polyethylene terephthalate, and polyethylene naphthalate, a cellulose-based resin such as diacetylcellulose and triacetylcellulose, an acrylic resin-based polymer such as polymethyl methacrylate, a styrene-based resin such as polystyrene, an acrylonitrile-styrene copolymer, a styrene resin, an acrylonitrile-styrene resin, an acrylonitrile-butadiene-styrene resin, an acrylonitrile-ethylene-styrene resin, a styrene-maleimide copolymer, and a styrene-maleic anhydride copolymer, and a polycarbonate-based resin. Additional examples include a cyclo olefin-based resin, a norbornene-based resin, a polyolefin-based resin such as polyethylene, polypropylene, and an ethylene-propylene copolymer, a vinyl chloride-based resin, an amide-based resin such as nylon and aromatic polyamide, an imide-based resin such as aromatic polyimide and polyimideamide, a sulfone-based resin, a polyether sulfone-based resin, a polyether ether ketone-based resin, a polyphenylene sulfide-based resin, a vinyl alcohol-based resin, a vinylidene chloride-based resin, a vinyl butyral-based resin, an allylate-based resin, a polyoxymethylene-based resin, an epoxy-based resin, a film obtained by imparting birefringence property to a polymer film containing a blend of the aforementioned resins, and a film obtained by coating a mixed solution containing a liquid crystal compound on a substrate and curing this. The birefringence property is spontaneously generated at preparation of a polymer film, or the birefringence property can be imparted by stretching the polymer film uniaxially or biaxially.

Birefringence property of the aforementioned other retardation film is not particularly limited, but when used in IPS mode, VA mode and OCB mode liquid crystal displays, a uniaxial retardation film having Re(590)=80 to 140 nm (Rth (590)/Re(590)=0.9 to 1.3), a negative uniaxial retardation film having Re(590)=0 to 5 nm and Rth(590)=90 to 400 nm, a uniaxial tilted oriented retardation film in which an optical axis is tilted at 10 to 80° from a substrate normal line, a biaxial retardation film having Re(590)=30 to 60 nm (Rth(590)/Re (590)=2.0 to 6.0), a biaxial retardation film having Re(590) =100 to 300 nm (Rth(590)/Re(590)=0.2 to 0.8), and a hybrid oriented retardation film in which a discotic liquid crystal molecule or a lod-like liquid crystal molecule is gradually tilted relative to a substrate normal line are preferably used. Further improvement in viewing angle property of a liquid crystal display can be expected by using the aforementioned uniaxial retardation film or biaxial retardation film together with the optical film of the present invention.

The retardation film of the present invention can be used as an optical film laminated on at least one side of a polarizer or a polarizing plate. A polarizing plate has usually a transparent protective film on one side or both sides of a polarizer. When a transparent protective film is disposed on both sides of a polarizer, transparent protective films of a surface and a back may be the same material, or different materials. A polarizing plate is usually arranged on both sides of a liquid crystal cell, and two polarizing plates are arranged so that absorbing axes are perpendicular to each other. The retardation film of the present invention can be laminated with a polarizer or a polarizing plate using an adhesive or a pressure-sensitive adhesive.

The optical film laminated so that the slow axis of the retardation film is parallel or perpendicular to an absorbing axis of a polarizer is preferably used. An angle formed by the slow axis of the retardation film and the absorption axis of the polarizer is preferably 0°±2°, more preferably 0°±1°, further preferably 0°±0.5° when the slow axis of the retardation film is arranged parallel to the absorption axis of the polarizer. On the other hand, when the slow axis of the retardation film is arranged perpendicular to the absorption axis of the polarizer, the angle is preferably 90°±2°, more preferably 90°±1°, further preferably 90°±0.5°. As an extent away from these angle ranges becomes larger, a polarization degree of a polarizing plate is reduced and, when used in a liquid crystal display, contrast is reduced. In the aforementioned optical film, a retardation film is not particularly limited, but a λ/2 plate is preferable. A λ/2 plate can be used by arranging two λ/4 plates so that the slow axis becomes parallel.

Some examples of the optical films of the present invention are shown in FIGS. 1 to 4. In an optical film 3A of FIG. 1, a polarizing plate 1A in which a transparent protective film 1c is arranged on one side of a polarizer 1a, and a retardation film 2 are arranged. The retardation film 2 is arranged opposite to the transparent protective film 1c relative to the polarizer 1a. The slow axis of the retardation film 2 is parallel to the absorption axis of the polarizer 1a in the figure, but may be perpendicular thereto.

Figure 2:
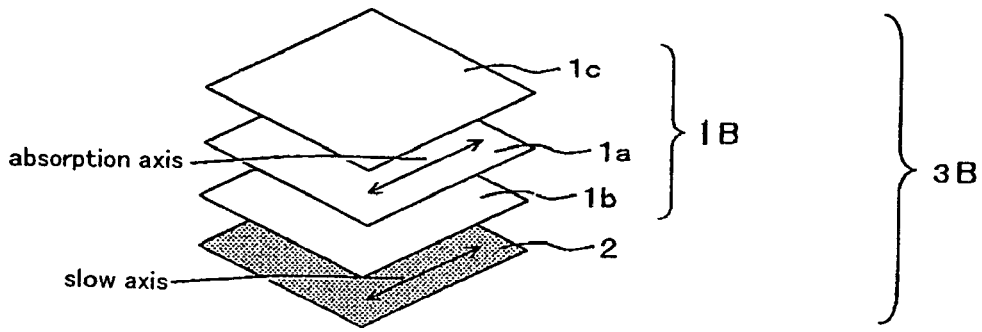
FIG. 2 is a schematic view showing one example of the polarizing plate of the present invention.

In the optical film 3B of FIG. 2, a polarizing plate 1B in which a transparent protective film 1b and a transparent protective film 1c are arranged on both sides of a polarizer 1a, and a retardation film 2 are arranged. The retardation film 2 is arranged on a side of the transparent protective film 1b. The slow axis of the retardation film 2 is parallel to the absorption axis of the polarizer 1a in the figure, but may be perpendicular thereto.

Figure 3:
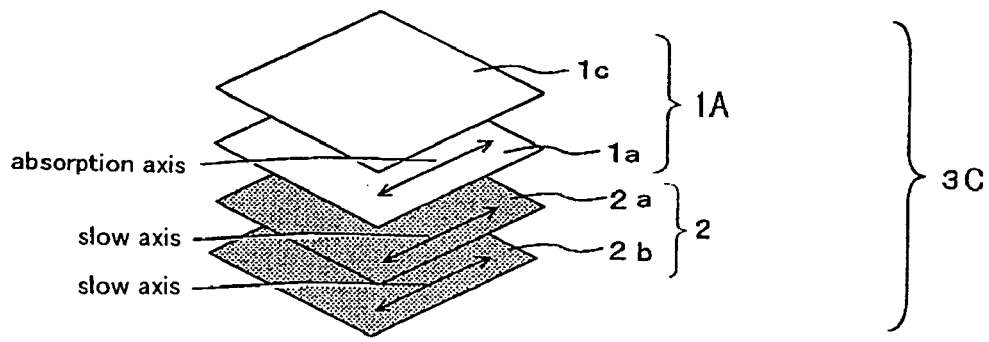
FIG. 3 is a schematic view showing one example of the polarizing plate of the present invention.

In the optical film 3C of FIG. 3, a polarizing plate 1A in which a transparent protective film 1c is arranged on one side of a polarizer 1a, and two retardation films 2a, 2b are arranged. The retardation films 2a and 2b are arranged opposite to the transparent protective film 1c relative to the polarizer 1a. The slow axes of the retardation films 2a and 2b are parallel to the absorption axis of the polarizer 1a, but may be perpendicular thereto.

Figure 4:
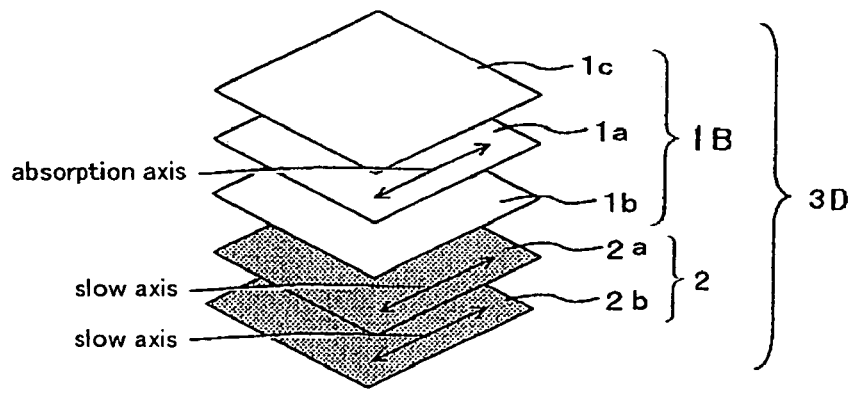
FIG. 4 is a schematic view showing one example of the polarizing plate of the present invention.

In the optical film 3D of FIG. 4, a polarizing plate 1B in which a transparent protective film 1b and a transparent protective film 1c are arranged on both sides of a polarizer 1a, and retardation films 2a and 2b are arranged. The retardation films 2a and 2b are arranged on a side of the transparent protective film 1b. The slow axes of the retardation films 2a and 2b are parallel to the absorption axis of the polarizer 1a, but may be perpendicular thereto.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol-based film, partially formalized polyvinyl alcohol-based film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol-based film on which dichromatic materials such as iodine is absorbed and aligned after stretched is suitably used because of having the high polarization dichroism. Although thickness of polarizer is not especially limited, the thickness of about 5 to 80 μm is commonly adopted.

A polarizer that is uniaxially stretched after a polyvinyl alcohol-based film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol-based film may be dipped in water and rinsed if needed.

By rinsing polyvinyl alcohol-based film with water, effect of preventing un-uniformity, such as unevenness of dyeing, is expected by making polyvinyl alcohol-based film swelled in addition that also soils and blocking inhibitors on the polyvinyl alcohol-based film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the protective film prepared in one side or both sides of the above-mentioned polarizer, with outstanding transparency, mechanical strength, heat stability, moisture cover property, isotropy, etc. may be preferable. As materials of the above-mentioned protective film, for example, polyester-based polymers, such as polyethylene terephthalate and polyethylenenaphthalate; cellulose-based polymers, such as diacetyl cellulose and triacetyl cellulose; acrylics-based polymer, such as poly methylmethacrylate; styrene-based polymers, such as polystyrene, acrylonitrile-styrene copolymer, acrylonitrile-styrene resin, styrene resin, acrylonitrile-styrene resin, acrylonitrile-butadiene-styrene resin, acrylonitrile-ethylene-styrene resin, styrene-maleimide copolymer, styrene-maleic anhydride copolymer; polycarbonate-based polymer may be mentioned. Besides, as examples of the polymer forming a protective film, polyolefin-based polymers, such as cyclo-olefin-based resin, norbornene-based resin, polyethylene, polypropylene, ethylene-propylene copolymer; vinyl chloride-based polymer; amide-based polymers, such as nylon and aromatic polyamide; imide-based polymers; sulfone-based polymers; polyether sulfone-based polymers; polyether-ether ketone-based polymers; poly phenylene sulfide-based polymers; vinyl alcohol-based polymer; vinylidene chloride-based polymers; vinyl butyral-based polymers; allylate-based polymers; polyoxymethylene-based polymers; epoxy type polymers; or blend polymers of the above-mentioned polymers may be mentioned. Films made of heat curing type or ultraviolet ray curing type resins, such as acryl-based, urethane-based, acryl urethane-based, epoxy-based, and silicone-based, etc. may be mentioned.

As the transparent protective film, a cellulose-based resin such as triacetylcellulose, and a norbornene-based resin are preferably used from a viewpoint of polarizing property and durability. Specific examples include product name "Fuji-tack" manufactured by Fuji Photo Film Co., Ltd., product name "ZEONOR" manufactured by Nippon Zeon Co., Ltd., and product name "Arton" manufactured by JSR.

Thickness of the transparent protective film can be appropriately determined, but generally is about from 1 to 500 μm, more preferably from 5 to 200 μm, particularly preferably from 10 to 150 μm from a viewpoint of strength, workability such as handling property, and thin property. When thickness is in the aforementioned range, a polarizer is mechanically protected and, even when exposed to high temperature and high humidity, a polarizer is not shrunk, and stable optical property can be retained.

It is preferable that the transparent protective film having an optimized retardation value is used since a retardation value in film plane and a retardation value in the thickness direction affect on viewing angle property of a liquid crystal display. Herein, a transparent protective film in which optimization of a retardation value is desired refers to a transparent protective film which is laminated on a surface of a polarizer on a side near a liquid crystal cell, and since a transparent protective film laminated on a surface of a polarizer on a side far a liquid crystal cell does not change optical property of a liquid crystal display, this is not the case.

Therefore, it is preferable that a transparent protective film laminated on a surface of a polarizer on a side near a liquid crystal cell has as small absolute value of birefringence or the photoelastic coefficient as possible.

In the optical films 3A to 3D, usually, a side of a retardation film 2(2a, 2b) is arranged on a liquid crystal cell side. Therefore, in optical films 3A to 3D, it is preferable to use a transparent protective film 1b on a side on which a retardation film 2(2a, 2b) is laminated which has an optimized retardation value.

It is preferable that the transparent protective film satisfies the following equation (3) and equation (4).

$$0 \text{ nm} < (nx-ny) \cdot d \leq 5 \text{ nm} \quad (3)$$

$$0 \text{ nm} < (nx-nz) \cdot d \leq 15 \text{ nm} \quad (4)$$

where the refractive indices in the slow axis direction, the fast axis direction and the thickness direction of the film are nx, ny and nz, respectively, d(nm) is thickness of the film, and the slow axis direction is a direction that the refractive index in film plane is maximum.

As described above, a retardation value in film plane is expressed by $Re(590)=(nx-ny) \cdot d$. A retardation value in film plane, which is expressed by Re(590), is further preferably 0 nm<Re(590)≦3 nm, particularly preferably 0 nm<Re(590)≦2 nm, most preferably 0 nm<Re(590)≦1 nm. In addition, as described above, a retardation value in the thickness direction of the film is expressed by $Rth(590)=(nx-nz) \cdot d$. A retardation value in the thickness direction of the film, which is expressed by Rth(590), is preferably 0 nm<Rth(590)≦10 nm, further preferably 0 nm<Rth(590)≦6 nm, particularly preferably 0 nm<Rth(590)≦4 nm, most preferably 0 nm<Rth(590)≦3 nm. When a retardation value of a transparent protective film which is laminated on the retardation film of the present invention is within the aforementioned range, display property such as a contrast ratio and a color shift is not adversely influenced when used in a liquid crystal display, and excellent display property can be obtained.

As an absolute value of photoelastic coefficient of a transparent protective film which is laminated on a surface of a polarizer on a side near a liquid crystal cell, an absolute value of a value measured with light at wavelength 590 nm, which is expressed by C value ($m^2$/N), is preferably in a range of $2.0 \times 10^{-13} \leq C \leq 2.0 \times 10^{-11}$, further preferably $5.0 \times 10^{-13} \leq C \leq 8.0 \times 10^{-12}$, particularly preferably $2.0 \times 10^{-12} \leq C \leq 6.0 \times 10^{-12}$, most preferably $2.0 \times 10^{-12} \leq C \leq 5.0 \times 10^{-12}$.

Since the retardation film of the present invention has a smaller absolute value of photoelastic coefficient than that of the previous aromatic polymer film, even when directly laminated on a polarizer via an adhesive or a pressure-sensitive adhesive, it is hard to cause a shift or a unevenness of a shrinking stress of a polarizer or a retardation value due to heat of backlight, and excellent display property can be obtained. When the retardation film of the present invention is laminated on a surface of a transparent protective film having a small absolute value of birefringence or the photoelastic coefficient, since a shrinking stress of a polarizer, and heat of backlight propagating to the retardation film can be reduced, a shift or a unevenness of a retardation value can be further reduced.

As a material forming the transparent protective film having a small absolute value of birefringence or the photoelastic coefficient, a norbornene-based resin obtained by hydrogenating a ring opening polymer or copolymer obtained by polymerizing a norbornene-based monomer described in JP-A-6-51117, if necessary polymer-modifying such as maleic acid addition and cyclopentadiene addition may be performed before hydrogenating; a norbornene-based resin obtained by addition-polymerizing a norbornene-based monomer; a norbornene-based resin obtained by addition-copolymerizing a norbornene-based monomer and an olefin-based monomer such as ethylene and α-olefin, are used. In addition, a cycloolefin-based resin obtained by polymerizing at least one polycycle cycloolefin monomer such as norbornene, a monocycle cycloolefin monomer and non-cyclic 1-olefin monomer in the solution state, the suspension state, the monomer melt state or the vapor phase under a metallocene catalyst described in JP-A-2002-348324 is also used.

In addition, a polycarbonate-based resin having 9,9-bis(4-hydroxyphenyl)fluorene on a side chain described in JP-A-2001-253960, and a cellulose-based resin described in JP-A-7-112446 are used. Further, a polymer film described in JP-A-2001-343529, for example, a resin composition containing a thermoplastic resin(A) having a substituted and/or non-substituted imido group on a side chain, and a thermoplastic resin(B) having substituted and/or non-substituted phenyl and a nitrile group on a side chain is used. As an embodiment, a polymer film of a resin composition containing an alternate copolymer containing isobutyrene and N-methylmaleimide and an acrylonitrile-styrene copolymer is used. In addition, a random copolymer of a monomer constituting a polymer exhibiting positive orientation birefringence, and a monomer constituting a polymer exhibiting negative orientation birefringence, and a polymer doped with an anisotropic low-molecular molecule or birefringence crystal described in "Technique of Development-Application of Optical Polymer Material", pp. 194-207 published by NTS Publisher in 2003 are used.

A method of laminating the transparent protective film with a polarizer is not particularly limited, but for example, can be performed via an adhesive containing an acrylic resin-based polymer or a vinyl alcohol-based polymer, or an adhesive containing at least a water-soluble crosslinking agent of a vinyl alcohol-based polymer such as boric acid, borax, glutaraldehyde, melamine and oxalic acid. Thereby, an objective product is peeled by influence of a humidity and heat with difficulty, and has excellent light transmittance and polarization degree. As the adhesive, it is preferable to use a polyvinyl alcohol-based adhesive in that adhesive strength with polyvinyl alcohol which is a raw material of a polarizer is excellent.

As a pressure-sensitive adhesive when the polymer film containing a norbornene-based resin as a transparent protective film is laminated with a polarizer, a pressure-sensitive adhesive which is excellent in transparency, has small birefringence, and can sufficiently exert a pressure-sensitive adhesive strength upon use as a thin layer is preferable. As such the pressure-sensitive adhesive, an adhesive for dry lamination obtained by a polyurethane-based resin solution and a polyisocyanate resin solution, a styrene butadiene rubber adhesive, and an epoxy-based two-component curing-type adhesive such as an adhesive containing two components of an epoxy resin and polythiol, and an adhesive containing two components of an epoxy resin and polyamide can be used. Particularly, a solvent-type adhesive, and an epoxy-based two-component curing-type adhesive are preferable, and a transparent adhesive is preferable. Some adhesives can improve an adhesive strength by using an appropriate undercoating agent for adhesion and, when such the adhesive is used, it is preferable to use an undercoating agent for adhesion.

The undercoating agent for adhesion is not particularly limited as far as it is a layer which can improve adhesive strength, but for example, a so-called coupling agent such as a silane-based coupling agent having a reactive functional group such as an amino group, a vinyl group, an epoxy group, a mercapto group, and a chloro group and a hydrolysable alkoxysilyl group in the same molecule, a titanate-based coupling agent having a hydrolysable hydrophilic group containing titanium and an organic functional group in the same molecule, and an aluminate-based coupling agent having a hydrolysable hydrophilic group containing aluminum and an organic functional group in the same molecule, and a resin having an organic reacting group such as an epoxy-based resin, an isocyanate-based resin, a urethane-based resin, and an ester urethane-based resin can be used. Among these, from a viewpoint of easy industrial handling, a layer containing a silane-based coupling agent is preferable.

In the polarizing plate, in order to make lamination on a liquid crystal cell easy, an adhesive layer or a pressure-sensitive adhesive layer can be provided on both sides or one side of the aforementioned transparent protective film of a polarizing plate. Also regarding the optical film, an adhesive layer or a pressure-sensitive adhesive layer can be provided on a retardation film.

The adhesive or pressure-sensitive adhesive is not particularly limited. An adhesive or a pressure-sensitive adhesive containing, as a base polymer, a polymer such as an acrylic resin-based polymer, a silicone-based polymer, polyester, polyurethane, polyamide, polyvinyl ether, vinyl acetate/vinyl chloride copolymer, modified polyolefin, and a rubber series such as epoxy series, fluorine series, natural rubber, and synthetic rubber can be used by appropriate selection. In particular, an acrylic resin-based pressure-sensitive adhesive is preferably used in that it is excellent in optical transparency, exhibits suitable wettability, and pressure-sensitive adhesive property of cohesiveness and adhering property, and is excellent in weather resistance and heat resistance.

The adhesive or pressure-sensitive adhesive can contain a crosslinking agent depending on a base polymer. In addition, an appropriate additive such as natural or synthetic resins, a filler or a pigment such as glass fibers, glass beads, metal powders and other inorganic powders, and a coloring agent and an antioxidant may be blended in a pressure-sensitive adhesive layer. Alternatively, transparent fine particles may be contained to obtain a pressure-sensitive adhesive layer exhibiting light diffusivity.

In the transparent fine particles include inorganic fine particles, which may being conductive, such as silica, calcium oxide, alumina, titania, zirconia, tin oxide, indium oxide, cadmium oxide, and antimony oxide, and crosslinked or uncrosslinked organic fine particles containing an appropriate polymer such as polymethyl methacrylate and polyurethane, which have an average particle diameter of 0.5 to 20 μm. These can be used appropriate one or more kinds.

The adhesive or pressure-sensitive adhesive is usually used as an adhesive solution in which a base polymer or a composition thereof is dissolved or dispersed in a solvent, and a solid matter concentration is about from 10 to 50% by weight. As the solvent, an organic solvent such as toluene and ethyl acetate, and water can be used by appropriate selection depending on a kind of an adhesive.

The adhesive or pressure-sensitive adhesive can be also provided on one side or both sides of a polarizing plate or an optical film as a laminate having different compositions or kinds. Thickness of the adhesive or pressure-sensitive adhesive can be appropriately determined depending on the use purpose and an adhesive strength, and is generally from 1 to 500 μm, preferably from 5 to 200 μm, particularly preferably from 10 to 100 μm.

An exposed surface of the adhesive layer or pressure-sensitive adhesive layer is covered with provisionally applying a releasing paper or releasing film (also referred to as separator) until practical use for the purpose of preventing stain thereof. Thereby, contact with an adhesive layer or a pressure-sensitive adhesive layer in the conventional handling state can be prevented. As the separator, for example, an appropriate separator as usual such as a separator obtained by coating-treating an appropriate thin film such as a plastic film, a rubber sheet, a paper sheet, a fabric, a non-woven fabric, a net, a foamed sheet, a metal foil, and a laminate thereof with an appropriate releasing agent such as a silicone series, a long chain alkyl series, a fluorine series and molybdenum sulfide can be used.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

An optical film may be used in practical use as a laminate with other optical layers. Although there is especially no limitation about the optical layers, one layer or two layers or more of optical layers, which may be used for formation of a liquid crystal display etc., such as reflective plate, a transflective plate, may be used. Especially preferable polarizing plates are; a reflection type polarization plate or a transflective type polarization plate in which a reflective plate or a transflective reflective plate is further laminated onto a polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported(PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light In a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a transflective type polarization plate is combined with above described retardation plate respectively.

Although an optical film in which the above described retardation film was laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised.

A liquid crystal panel in which the optical film of the present invention is used will be explained. FIGS. 5 to 10 show one example of the liquid crystal panel of the present invention.

Figure 5:
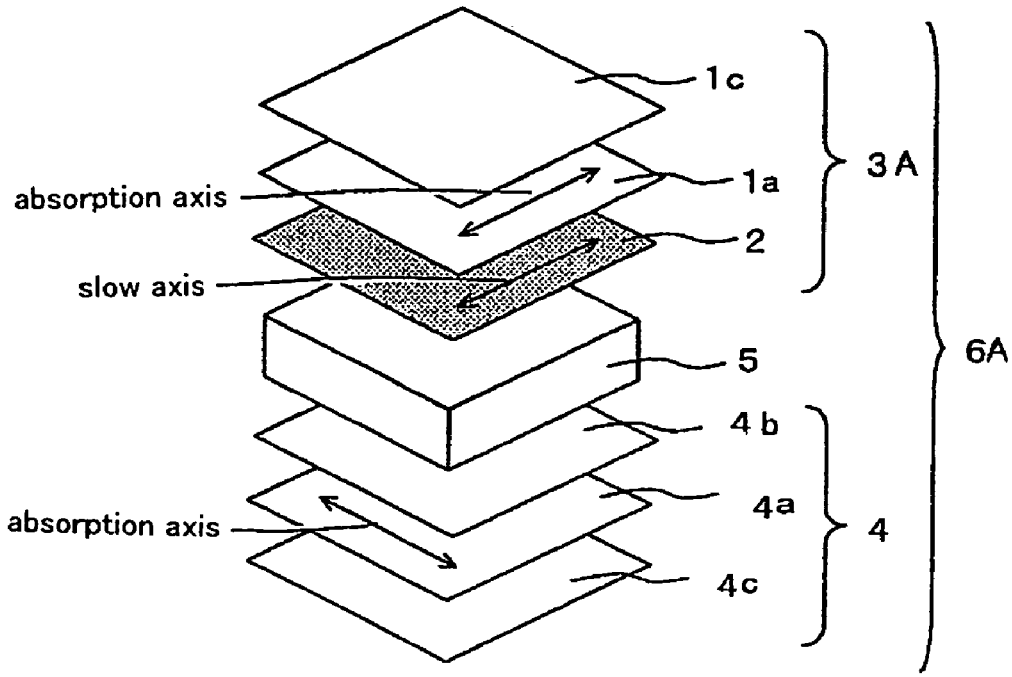
FIG. 5 is a schematic view showing one example of the liquid crystal panel of the present invention.

In the liquid crystal panel 6A of FIG. 5, an optical film 3A is arranged on one side of a liquid crystal cell 5 so that a retardation film 2 is on a side near the liquid crystal cell. In addition, a polarizing plate 4 in which transparent protective films 4b and 4c are arranged on both sides of a polarizer 4a is arranged on other side of the liquid crystal cell 5, so that the transparent protective film 4b is on a side near the liquid crystal cell 5. The slow axis of the retardation film 2 is parallel to the absorption axis of the polarizer 1a in the figure, but may be perpendicular thereto.

Figure 6:
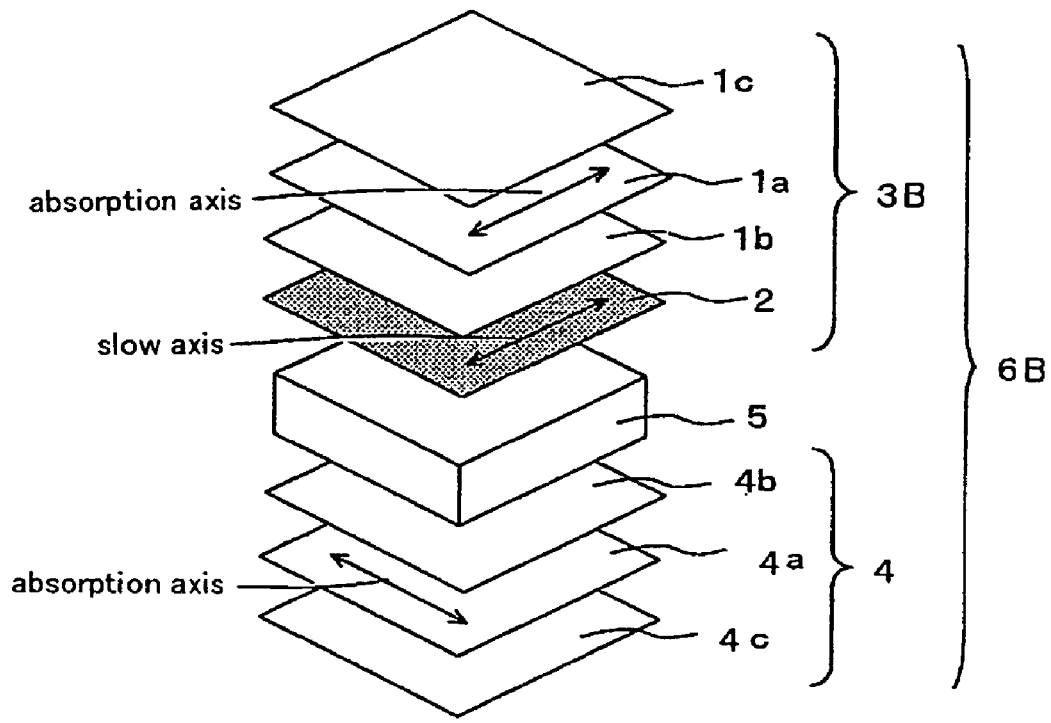
FIG. 6 is a schematic view showing one example of the liquid crystal panel of the present invention.

In the liquid crystal panel 6B of FIG. 6, an optical film 3B is arranged on one side of a liquid crystal cell 5 so that a retardation film 2 is on a side near the liquid crystal cell. In addition, a polarizing plate 4 is arranged on other side of the liquid crystal cell 5 so that a transparent protective film 4b is on a side near the liquid crystal cell 5. The slow axis of the retardation film 2 is parallel to the absorption axis of the polarizer 1a in the figure, but may be perpendicular thereto.

Figure 7:
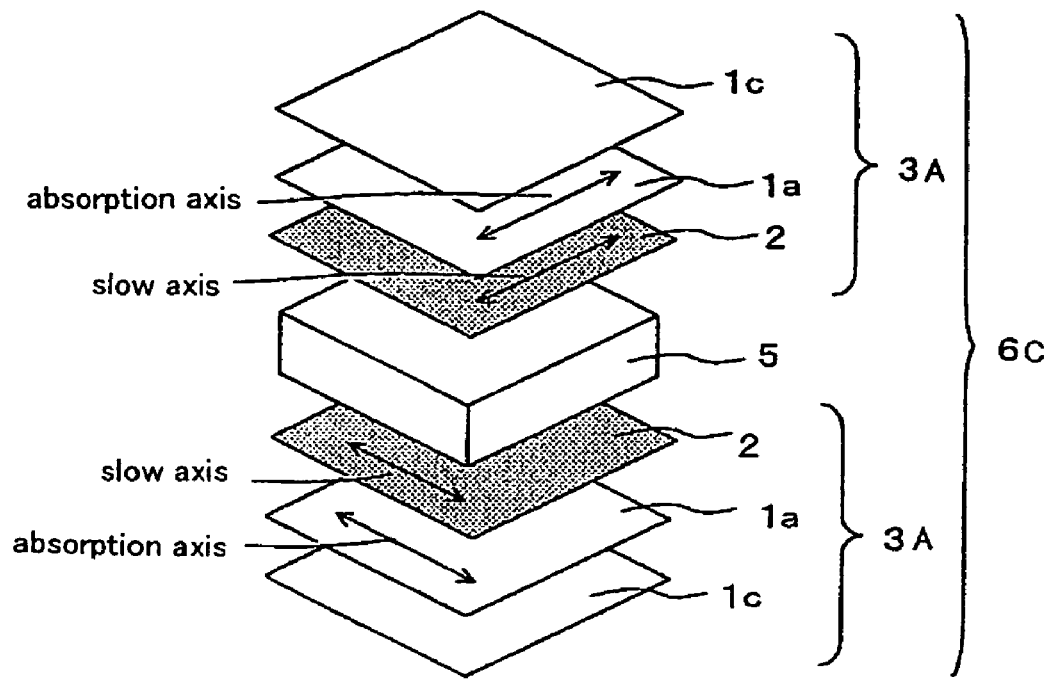
FIG. 7 is a schematic view showing one example of the liquid crystal panel of the present invention.

In the liquid crystal panel 6C of FIG. 7, an optical film 3A is arranged on both sides of a liquid crystal cell 5 so that each retardation film 2 is on a side near the liquid crystal cell 5. Slow axes of respective retardation films 2 are arranged so as to be perpendicular to each other. The slow axis of the retardation film 2 is parallel to the absorption axis of the polarizer 1a in the figure, but may be perpendicular thereto.

Figure 8:
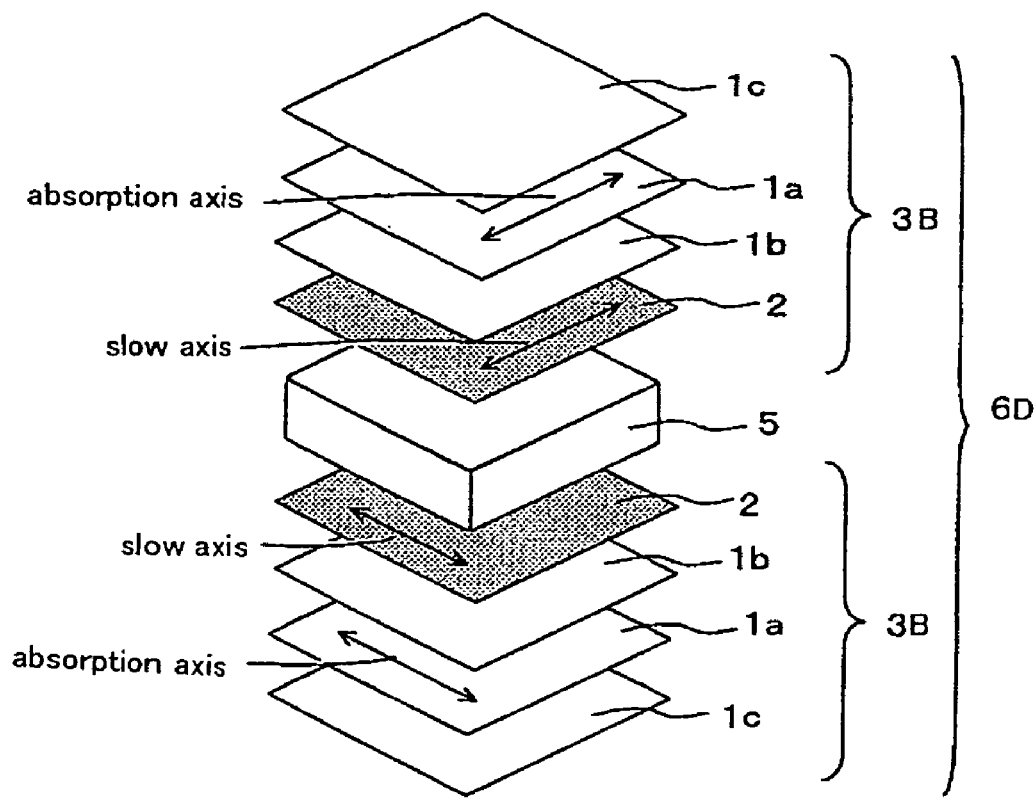
FIG. 8 is a schematic view showing one example of the liquid crystal panel of the present invention.

In the liquid crystal panel 6D of FIG. 8, an optical film 3B is arranged on both sides of a liquid crystal cell 5 so that each retardation film 2 is on a side near the liquid crystal cell 5. Slow axes of the respective retardation films 2 are arranged so as to be perpendicular to each other. The slow axis of the retardation film 2 is parallel to the absorption axis of the polarizer 1a in the figure, but may be perpendicular thereto.

Figure 9:
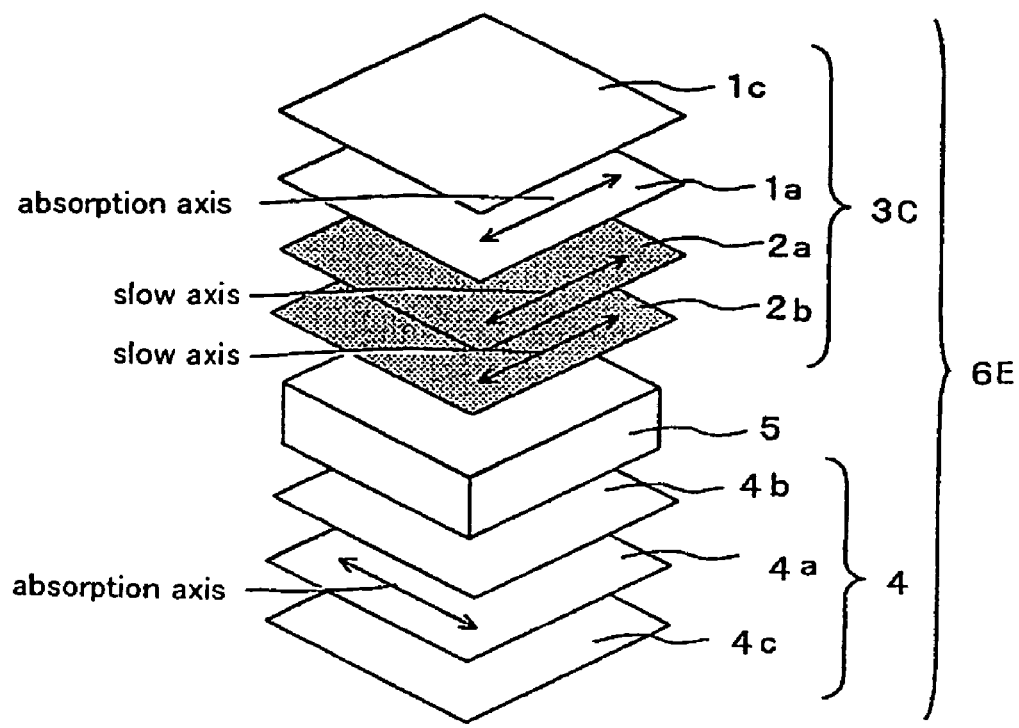
FIG. 9 is a schematic view showing one example of the liquid crystal panel of the present invention.

In the liquid crystal panel 6E of FIG. 9, an optical film 3C is arranged on one side of a liquid crystal cell 5 so that a retardation film 2 is on a side near the liquid crystal cell 5. Slow axes of the respective retardation films 2 are parallel to each other in the figure, but may be perpendicular thereto. In addition, a polarizing plate 4 is arranged on other side of the liquid crystal cell 5 so that a transparent protective film 4b is on a side near the liquid crystal cell. Slow axes of the retardation films 2(2a, 2b) are parallel to the absorption axis of the polarizer 1a in the figure, but may be perpendicular thereto.

Figure 10:
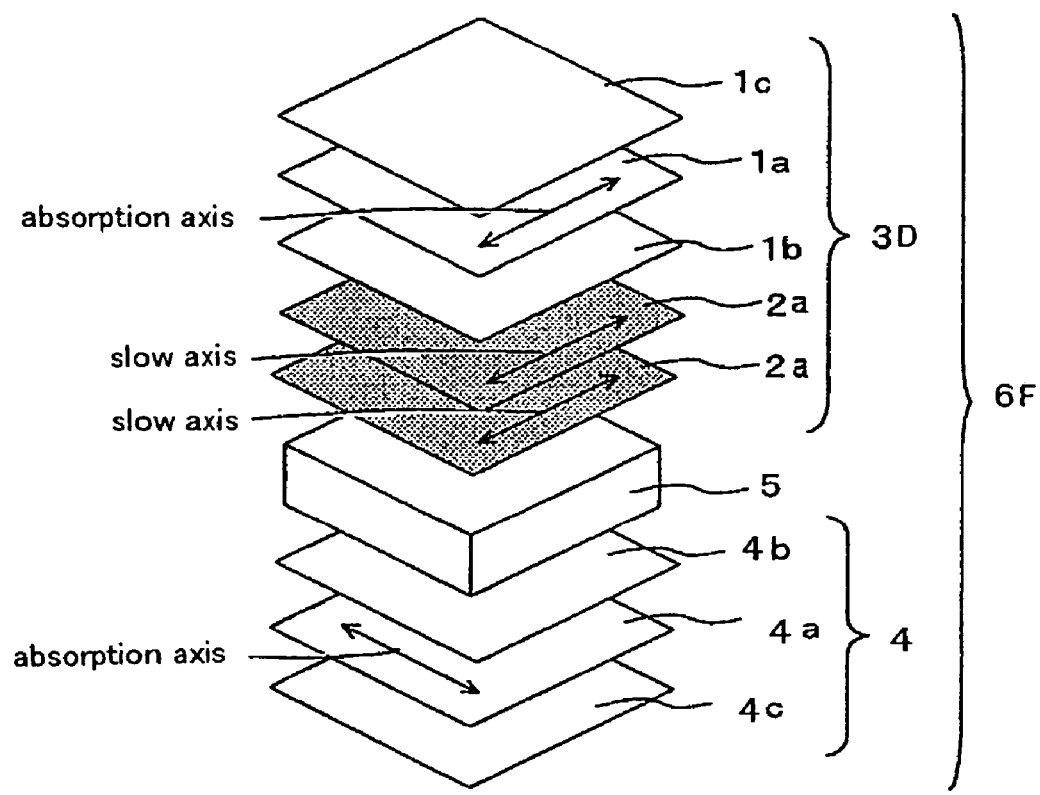
FIG. 10 is a schematic view showing one example of the liquid crystal panel of the present invention.

In a liquid crystal panel 6F of FIG. 10, an optical film 3D is arranged on one side of a liquid crystal cell 5 so that a retardation film 2 is on a side near the liquid crystal cell 5. Slow axes of the respective retardation films 2 are parallel to each other in the figure, but may be perpendicular thereto. In addition, a polarizing plate 4 is arranged on other side of the liquid crystal cell 5 so that a transparent protective film 4b is on a side near the liquid crystal cell. Slow axes of the retardation films 2(2a, 2b) are parallel to the absorption axis of the polarizer 1a in the figure, but may be perpendicular thereto.

In the liquid crystal panel of the present invention, by inclusion of a stretched film of a polymer film containing a norbornene-based resin, uniform display in which no unevenness is present on an entire panel surface can be obtained, for example, when a black image is displayed. Preferably, in the liquid crystal panel of the present invention, a difference between a maximum brightness and a minimum brightness is 1.79 or less, further preferably 1.57 or less in an entire panel surface on which a black view is displayed.

The retardation film and the optical film of the present invention can be applied to various image displays. A liquid crystal panel using the retardation film or the optical film can be applied to various devices which have been previously known such as a liquid crystal display. Formation of a liquid crystal display can be performed according to the previous method. A liquid crystal display has generally a liquid crystal panel and, further, backlight. A liquid crystal display is formed by appropriately assembling the aforementioned constituent parts and incorporating the assembly into a driving circuit.

A kind of the liquid crystal display is not particularly limited, but any form of a transmission type, a reflection type and a transflective type can be used. Examples of a liquid crystal cell used in the liquid crystal display include various liquid crystal cells such as twisted nematic (TN) mode, supertwisted nematic (STN) mode, homogeneous alignment (ECB) mode, vertical alignment(VA) mode, in plane switching (IPS) mode, fringe field switching (FFS) mode, bend nematic (OCB) mode, hybrid alignment (HAN) mode, ferroelectric liquid crystal (SSFLC) mode, and antiferroelctric liquid crystal (AFLC) mode liquid crystal cells. Among them, it is preferable to use the retardation film and the polarizing plate of the present invention, by combining, in particular, with TN mode, VA mode, IPS mode, OCB mode, FFS mode, and OCB mode liquid crystal cells. Most preferably, a retardation film and the polarizing plate of the present invention are used by combining with an IPS mode or FFS mode liquid crystal cell.

The twisted nematic (TN) mode liquid crystal cell is such that a positive dielectric anisotripic nematic liquid crystal is held between substrates, and refers to that cell in which liquid crystal molecule alignment is twisted by 90 degree by surface alignment treatment of a glass substrate. Specific examples include a liquid crystal cell described in "Liquid crystal Dictionary" p. 158 (1989 edition) published by Byfucan, and a crystal liquid cell described in JP-A-63-279229.

The vertical alignment (VA) mode liquid crystal cell refers to a crystal liquid cell in which a nematic crystal having a negative dielectric anisotropy is vertically arranged between transparent electrodes at application of no voltage utilizing electrically controlled birefringence (ECB) effect. Specific examples include liquid crystal cells described in JP-A No.62-210423, and JP-A No.4-153621. In addition, the VA mode liquid crystal may be a liquid crystal cell in which a slit is provided in a pixel for enlarging a viewing angle as described in JP-A-11-258605, or MVA mode liquid crystal cell in which multidomaination is performed by using a substrate with a protrusion formed on a surface thereof. Further, as described in JP-A-10-123576, a VATN mode liquid crystal cell may be used in which a crystal agent is added to a liquid crystal, and vertical alignment is substantially performed at application of no nematic liquid crystal voltage and twisted multidomain alignment is performed at application of a voltage.

The in plane switching (IPS) mode liquid crystal cell refers to a liquid crystal cell in which a nematic liquid crystal which is homogeneously aligned in the state of no existence of an electric field is made to respond in an electric filed parallel to a substrate (also referred to as transverse electric field), in a so-called sandwich cell in which a liquid crystal is encapsulated between two parallel substrates utilizing electrically controlling birefringence (ECB) effect. Specifically, the IPS mode liquid crystal cell refers to a liquid crystal cell in which, when a long axis of a liquid crystal molecule and a polarizing axis of an incident side polarizing plate are consistent, and upper and lower polarizing are arranged perpendicularly, complete black view is obtained in the state of no electric filed, and a liquid crystal molecule is rotated while retaining parallel to a substrate, thereby, a transmittance can be obtained depending on a rotation angle when an electric field is present, as described in "Monthly Display No. July " pp 83 to 88 (1997 edition) published by Technotimes, and "Liquid Crystal, vol. 2 No. 4" pp 303-316 (1998 edition) published by Japan Society of liquid Crystal. The IPS mode includes super-in plain switching (S-IPS) mode adopting a zigzag electrode, and advanced-super-in plain switching (AS-IPS) mode. Examples of a commercially available liquid crystal display adopting the aforementioned IPS mode include 20V-type wide liquid crystal television: trade name "Wooo" manufactured by Hitachi, Ltd., 19-type liquid crystal display: trade name "Prolite E481S-1" manufactured by Iiyama, and 17-type TFT liquid crystal display: trade name "FlexScan L565" manufactured by Nanao.

The FFS mode liquid crystal display cell refers to a liquid crystal cell in which a nematic liquid crystal which is aligned into a homogenous molecular sequence in the state of no existence of an electric field utilizing electrically controlled birefringence (ECB) effect is made to respond in an electric field parallel to substrate (also referred to as transverse electric filed) which is generated, for example, by an opposite electrode formed of a transparent electric conductor and a pixel electrode. A transverse electric filed in FFS mode is also referred to as fringe electric field. This fringe electric field can be generated by setting an interval between an opposite electrode formed of a transparent electric conductor and a pixel electrode narrower than an interval between upper and lower substrates. More specifically, as described in SID (Society for Information Display) 2001, Digest, pp 484-487, and JP-A-2002-031812, in a normally black system, when a long axis of liquid crystal molecule and the absorption axis of an incident side polarizing plate are consistent, and upper and lower polarizing plates are arranged perpendicularly, complete black view is-obtained in the state of no electric field, and a liquid crystal molecule is rotated while retaining parallel to a substrate, thereby, a transmittance can be obtained depending on a rotation angle when there is an electric field. The FFS mode includes advanced-fringe field switching (A-FFS) mode adopting a zigzag electrode, and ultra-fringe field switching (U-FFS) mode. Examples of a commercially available liquid crystal display adopting the aforementioned FFS mode include Doublet PC: trade name "M1400" of Motion Computing.

The bend nematic (OCB: Optically Compensated Bend or Optically Compensated Birefringence) mode liquid crystal cell refers to a liquid crystal cell in which a nematic liquid crystal having positive dielectric anisotropy is bend-aligned between transparent electrodes at application of no voltage so that a twisted orientation is present at a central part, utilizing electrically controlled birefringence (ECB) effect. The OCB mode liquid crystal cell is also referred to as "π cell". Specific examples include a liquid crystal cell described in "Next Generation Liquid Crystal Display" (2000) pp 11-27 published by Kyoritushupan, and a liquid crystal cell described in JP-A-7-084254.

By using the optical film of the present invention in such the various liquid crystal cells, display property such as a contrast ratio and a color shift can be improved and, moreover, function can be maintained for a long term.

As backlight, direct under-type backlight, sidelight-type backlight, and planner light source can be used. In addition, a reflecting plate can be used with backlight. Further, upon formation of a liquid crystal display, one or more layers of an appropriate part such as a diffusion plate, an antiglare layer, a reflection preventing membrane, a protecting plate, a prism array, a lens array sheet, and a light diffusion plate can be arranged at an appropriate position.

Utility for use of the liquid crystal panel and the liquid crystal display of the present invention is not particularly limited, but they ban be used in various utilities such as OA instruments such as a personal computer monitor, a laptop, and a copying machine; portable instruments such as a mobile phone, a watch, a digital camera, a portable information terminal (PDA), and a portable game machine; home electric instruments such as video camera, a liquid crystal television, and a microwave; car instruments such as back monitor, a car navigation system monitor, and a car audio; exhibition instrument such as commercial shop information monitor, alarm instrument such as monitoring monitor, and care-medical instrument such as care monitor, and medical monitor.

Particularly preferably, the liquid crystal panel and the liquid crystal display of the present invention are used in a large scale liquid crystal television. A screen size of a liquid crystal television in which the liquid crystal panel and the liquid crystal display of the present invention are used, is preferably wide 17 type (373 mm×224 mm) or larger, further preferably wide 23 type (499 mm×300 mm) or larger, particularly preferably wide 26 type (566 mm×339 mm) or larger, most preferably wide 32-type (687 mm×412 mm) or larger.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to π/4, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLE

The present invention will be further explained using the following Examples and Comparative Examples. The present invention is not limited to these Examples. Each analyzing method used in Examples is as follows:

(1) Method of measuring weight average molecular weight: A weight average molecular weight was calculated using polystyrene as a standard sample by a gel permeation chromatography (GPC). Specifically, the weight average molecular weight was measured at a column temperature of 40° C. and a flow rate of 1 mL/min using toluene as a developing solvent.

(2) Method of measuring glass transition temperature (Tg): A glass transition temperature was obtained using the following apparatus according to JIS K 7121.
"Differential scanning calorimeter "DSC5500" manufactured by Seiko Electronics
Measurement atmosphere: under nitrogen at 20 ml/min
Temperature rising rate 10° C./min (3) Method of measuring retardation value, birefringence, dispersion property, angle of slow axis, and light transmittance: Values at wavelength 590 nm were measured using a retardation meter [product name "KOBRA21-ADH" manufactured by Ogi Measuring Instrument] employing a parallel Nicol rotation method. Regarding dispersion property, light source at wavelength 480 nm was also used.

(4) Method of measuring absolute value of photoelastic coefficient: A retardation value of a sample measured under a stress using a spectroscopic ellipsometer [product name "A-220" manufactured by JASCO Corporation], and the coefficient was calculated from a slope of a function of a stress and a retardation value. Specifically, a retardation value in film plane at wavelength (590 nm) when a stress of from 5 N to 15 N was applied to a 2 cm×10 cm test piece was measured at 23° C.

(5) Method of measuring thickness: The thickness was measured using a digital micrometer "K-351 C type" manufactured by Anlitsu.

(6) Method of measuring shrinkage percentage of shrinkable film: The shrinkage percentage can be obtained according to heat shrinkage percentage (A) method of JIS Z 1712, except that 140° C. of a heating temperature was used in place of 120° C. and a load 3 g was applied to a test piece. Specifically, each five test pieces of a width 20 mm and a length 150 mm were sampled in machine (MD) and transverse (TD) directions, and test pieces having a mark at a central part at an interval of about 100 mm were prepared. The test piece was suspended vertically in an air circulating constant temperature bath retained at a temperature of 140° C.±3° C. or a temperature of 160° C.±3° C. in the state where a load 3 g was applied, heated for 15 minutes, and taken from the bath, allowed to stand at a standard temperature (room temperature) for 30 minutes, a distance between standards was measured using a vernier caliper prescribed in JIS B 7507, an average of five measurement values was obtained, and $S^{140}$ (MD) and $S^{140}$ (TD), as well as $S^{160}$ (MD) and $S^{160}$ (TD) were calculated from S=[(distance between standards before heating (mm)−distance between standards after heating (mm))/distance between standards before heating (mm)]×100.

(7) Method of measuring shrinkage stress in transverse direction (TD) of shrinkable film: Shrinkage stress $T^{140}$(TD) and shrinkage stress $T^{150}$(TD) in a transverse direction (TD) at 140° C. and 150° C. were measured by the TMA method using the following apparatus.
Apparatus: "TMA/SS 6100" manufactured by Seiko Instruments
Data processing: "EXSTAR6000" manufactured by Seiko Instruments
Measurement mode: uniform temperature rising measurement (10° C./min)
Measurement atmosphere: in the air (room temperature)
Load: 20 mN
Sample size: 15 mm×2 mm (long side is transverse direction (TD))

(8) Method of measuring contrast ratio of liquid crystal display: Using the following method and measurement apparatus, backlight was turned on in a dark chamber at 23° C., 30 minutes passed, and measurement was performed. A liquid crystal display apparatus was made to display a white image and a black image, and a Y value of a XYZ display system in an azimuth angle 45° direction and a polar angle 60° direction of a display screen, which is one of directions of largest light leakage on a display screen was measured by product name "EZ Contrast 160D" manufactured by ELDIM. An inclined direction contrast ratio "YW/YB" was calculated from a Y value in a white image (YW) and a Y value in a black image (YB). An azimuth angle 45° represents an azimuth in which rotation is performed by 45° counterclockwisely letting a long side of a panel to be 0°, and a polar angle 60° represents a direction in which inclination is performed at an angle of 60° letting a front direction of a display screen to be 0°.

(9) Method of assessing viewing unevenness of liquid crystal panel: A displayed screen was photographed using the following liquid crystal cell and measuring apparatus. In Table, "○" represents a difference between a maximum brightness and a minimum brightness of 1.79 or less in a panel entire surface displaying a black image. "x" represents a difference between a maximum brightness and a minimum brightness of more than 1.79 in a panel entire surface displaying a black image.
Liquid crystal cell: equipped on KLV-17 HR2 manufactured by SONY
Panel size: 375 mm×230 mm
Measurement apparatus: two-dimensional color distribution measuring apparatus "CA-1500" manufactured by MINOLTA
Measurement environment: dark chamber (23° C.)

[Shrinkable Film]

The following shrinkable films (A) to (F) were used. Physical properties of them are as shown in Table 1.

Shrinkable film (A): biaxial stretched polypropylene film [trade name "Trephan" BO 2570A-1 manufactured by Toray Industries, Inc. (thickness 60 µm)]

Shrinkable film (B): biaxial stretched polypropylene film [trade name "Trephan" BO 2570A-2 manufactured by Toray Industries, Inc. (thickness 60 µm)]

Shrinkable film (C): biaxial stretched polypropylene film [trade name "Trephan" BO 2570A-3 manufactured by Toray Industries, Inc. (thickness 60 µm)]

Shrinkable film (D): biaxial stretched polypropylene film [trade name "Trephan" BO 2570A-4 manufactured by Toray Industries, Inc. (thickness 60 µm)]

Shrinkable film (E): biaxial stretched polypropylene film [trade name "Trephan" BO 2570A-5 manufactured by Toray Industries, Inc. (thickness 60 µm)]

Shrinkable film (F): biaxial stretched polypropylene film [trade name "Trephan" BO 2570A-6 manufactured by Toray Industries, Inc. (thickness 60 µm)]

TABLE 1

| Shrinkable film | Shrinkage percentage $S^{140}$ (MD) (%) | Shrinkage percentage $S^{140}$ (TD) (%) | $\Delta S^{140}$ (%) | Shrinkage percentage $S^{160}$ (MD) (%) | Shrinkage percentage $S^{160}$ (TD) (%) | $\Delta S^{160}$ (%) | Shrinkage stress $T^{140}$ (TD) (N/2 mm) | Shrinkage stress $T^{150}$ (TD) (N/2 mm) |
|---|---|---|---|---|---|---|---|---|
| A | 5.7 | 7.6 | 1.9 | 18.0 | 35.7 | 17.7 | 0.45 | 0.56 |
| B | — | — | — | 17.0 | 39.7 | 22.7 | 0.54 | 0.65 |
| C | — | — | — | 16.7 | 42.0 | 25.3 | 0.61 | 0.71 |
| D | — | — | — | 19.7 | 45.3 | 25.6 | 0.63 | 0.74 |
| E | 6.4 | 12.8 | 6.4 | 19.6 | 45.5 | 25.9 | 0.65 | 0.75 |
| F | — | — | — | 20.3 | 48.5 | 28.2 | 0.75 | 0.85 |

Example 1

A shrinkable film (E) was applied on both sides of a polymer film (trade name "ZEONOR ZF14-100" manufactured by Nippon Zeon Co., Ltd.) having thickness of 100 μm containing a resin in which a ring opening polymer obtained by polymerizing a norbornene-based monomer had been hydrogenated, via an acrylic resin-based pressure-sensitive adhesive layer (thickness 15 μm). Thereafter, a film was retained at the machine direction with a roll stretching machine, and the film was stretched at 1.38 times in an air circulating constant temperature oven at 146° C.±1° C. Properties of the resulting retardation film are as shown in Table 2. A glass transition temperature (Tg) of the polymer film containing a resin in which a ring opening polymer obtained by polymerizing a norbornene-based monomer had been hydrogenated was 136° C., a retardation value in film plane before stretching was 5.0 nm, and a retardation value in the thickness direction was 12.0 nm.

As the acrylic resin-based pressure-sensitive adhesive, an adhesive obtained by mixing 3 parts by weight of trade name "Coronate L" manufactured by Nippon Polyurethane Industries Co., Ltd., and 10 parts by weight of trade name "OL-1" manufactured by Tokyo Fine Chemical relative to 100 parts by weight of an isononyl acrylate polymer having a weight average molecular weight obtained by a GPC method using tetrahydrofuran as a solvent of 550,000, was used.

Example 2

According to the same manner as that of Example 1 except that a stretching temperature was changed from 146° C. to 140° C., and a stretching ratio was changed from 1.38 times to 1.08 times, a retardation film was prepared. Properties of the resulting retardation film are shown in Table 2.

Example 3

According to the same manner as that of Example 1 except that a stretching temperature was changed from 146° C. to 140° C., and a stretching ratio was changed from 1.38 times to 1.09 times, a retardation film was prepared. Properties of the resulting retardation film are shown in Table 2.

Example 4

According to the same manner as that of Example 1 except that a stretching temperature was changed from 146° C. to 155° C., and a stretching ratio was changed from 1.38 times to 1.30 times, a retardation film was prepared. Properties of the resulting retardation film are shown in Table 2.

Example 5

According to the same manner as that of Example 1 except that a stretching temperature was changed from 146° C. to 150° C., and a stretching ratio was changed from 1.38 times to 1.20 times, a retardation film was prepared. Properties of the resulting retardation film are shown in Table 2.

Example 6

According to the same manner as that of Example 1 except that a stretching temperature was changed from 146° C. to 145° C., and a stretching ratio was changed from 1.38 times to 1.20 times, a retardation film was prepared. Properties of the resulting retardation film are shown in Table 2.

Example 7

According to the same manner as that of Example 1 except that a stretching temperature was changed from 146° C. to 148° C., and a stretching ratio was changed from 1.38 times to 1.30 times, a retardation film was prepared. Properties of the resulting retardation film are shown in Table 2.

Example 8

According to the same manner as that of Example 1 except that a stretching temperature was changed from 146° C. to 148° C., and a stretching ratio was changed from 1.38 times to 1.35 times, a retardation film was prepared. Properties of the resulting retardation film are shown in Table 2.

Example 9

According to the same manner as that of Example 1 except that a stretching temperature was changed from 146° C. to 148° C., and a stretching ratio was changed from 1.38 times to 1.40 times, a retardation film was prepared. Properties of the resulting retardation film are shown in Table 2.

Example 10

A shrinkable film (E) was applied on both sides of a polymer film (trade name "ZEONOR ZF14-040" manufactured by Nippon Zeon Co., Ltd.) having thickness of 40 μm containing a resin in which a ring opening polymer obtained by polymerizing a norbornene-based monomer had been hydrogenated, via an acrylic resin-based pressure-sensitive adhesive layer (thickness 15 μm) used in Example 1. Thereafter, a film was retained at the machine direction with a roll stretching machine, and the film was stretched at 1.58 times at 143° C.±1° C. Properties of the resulting retardation film are as shown in Table 2. A glass transition temperature (Tg) of the polymer film containing a resin in which a ring opening polymer obtained by polymerizing a norbornene-based monomer had been hydrogenated was 136° C., a retardation value in film plane before stretching was 1.0 nm, and a retardation value in the thickness direction was 3.0 nm.

Example 11

According to the same manner as that of Example 10 except that a stretching ratio was changed from 1.58 times to 1.52 times, a retardation film was prepared. Properties of the resulting retardation film are shown in Table 2.

Example 12

According to the same manner as that of Example 10 except that a stretching ratio was changed from 1.58 times to 1.45 times, a retardation film was prepared. Properties of the resulting retardation film are shown in Table 2.

Example 13

A shrinkable film (A) was applied on both sides of a polymer film (trade name "ZEONOR ZF14-040" manufactured by Nippon Zeon Co., Ltd.) having thickness of 40 μm containing a resin in which a ring opening polymer obtained by polymerizing a norbornene-based monomer had been hydrogenated, via an acrylic resin-based pressure-sensitive adhesive layer (thickness 15 μm) used in Example 1. Thereafter, a film was retained at the machine direction with a roll stretching machine, and the film was stretched at 1.65 times at 143° C.±1° C. Properties of the resulting retardation film are as shown in Table 2.

Example 14

According to the same manner as that of Example 13 except that a stretching ratio was changed from 1.65 times to 1.50 times, a retardation film was prepared. Properties of the resulting retardation film are shown in Table 2.

Example 15

According to the same manner as that of Example 13 except that a stretching ratio was changed from 1.65 times to 1.50 times, a retardation film was prepared. Properties of the resulting retardation film are shown in Table 2.

Example 16

A shrinkable film (C) was applied on both sides of a polymer film (trade name "Arton FLZU130DO" manufactured by JSR.) having thickness of 130 μm containing a resin in which a ring opening polymer obtained by polymerizing a norbornene-based monomer had been hydrogenated, via an acrylic resin-based pressure-sensitive adhesive layer (thickness 15 μm) used in Example 1. Thereafter, a film was retained at the machine direction with a roll stretching machine, and the film was stretched at 1.42 times at 146° C.±1° C. Properties of the resulting retardation film are as shown in Table 2.

Example 17

A shrinkable film (F) was applied on both sides of a polymer film (trade name "Arton FLZU130DO" manufactured by JSR.) having thickness of 130 μm containing a resin in which a ring opening polymer obtained by polymerizing a norbornene-based monomer had been hydrogenated, via an acrylic resin-based pressure-sensitive adhesive layer (thickness 15 μm) used in Example 1. Thereafter, a film was retained at the machine direction with a roll stretching machine, and the film was stretched at 1.37 times in an air circulating constant temperature oven at 146° C.±1IC. Properties of the resulting retardation film are as shown in Table 2. A glass transition temperature (Tg) of the polymer film containing a resin in which a ring opening polymer obtained by polymerizing a norbornene-based monomer had been hydrogenated was 125° C., a retardation value in film plane before stretching was 9.6 nm, and a retardation value in the thickness direction was 31.3 nm. And a weight average molecular weight was 74,000, a number average molecular weight was 23,500.

Example 18

According to the same manner as that of Example 17 except that a stretching ratio was changed from 1.37 times to 1.26 times, a retardation film was prepared. Properties of the resulting retardation film are shown in Table 2.

Example 19

A shrinkable film (D) was applied on both sides of a polymer film (trade name "Arton FLZU130DO" manufactured by JSR.) having thickness of 130 μm containing a resin in which a ring opening polymer obtained by polymerizing a norbornene-based monomer had been hydrogenated, via an acrylic resin-based pressure-sensitive adhesive layer (thickness 15 μm) used in Example 1. Thereafter, a film was retained at the machine direction with a roll stretching machine, and the film was stretched at 1.39 times at 146° C.±1° C. Properties of the resulting retardation film are as shown in Table 2.

Example 20

According to the same manner as that of Example 19 except that a stretching temperature was changed from 146° C. to 148° C., and a stretching ratio was changed from 1.39 times to 1.26 times, a retardation film was prepared. Properties of the resulting retardation film are shown in Table 2.

Example 21

According to the same manner as that of Example 19 except that a stretching ratio was changed from 1.39 times to 1.43 times, a retardation film was prepared. Properties of the resulting retardation film are shown in Table 2.

Example 22

A shrinkable film (C) was applied on both sides of a polymer film (trade name "ZEONOR ZF14-100" manufactured by Nippon Zeon Co., Ltd.) having thickness of 100 μm containing a resin in which a ring opening polymer obtained by polymerizing a norbornene-based monomer had been hydrogenated, via an acrylic resin-based pressure-sensitive adhesive layer (thickness 15 μm) used in Example 1. Thereafter, a film was retained at the machine direction with a roll stretching machine, and the film was stretched at 1.39 times at 146° C. Properties of the resulting retardation film are as shown in Table 2.

Example 23

According to the same manner as that of Example 22 except that a stretching temperature was changed from 146° C. to 150° C., and a stretching ratio was changed from 1.39 times to 1.32 times, a retardation film was prepared. Properties of the resulting retardation film are shown in Table 2.

Example 24

According to the same manner as that of Example 22 except that a stretching temperature was changed from 146° C. to 149° C., and a stretching ratio was changed from 1.39 times to 1.35 times, a retardation film was prepared. Properties of the resulting retardation film are shown in Table 2.

Example 25

A shrinkable film (B) was applied on both sides of a polymer film (trade name "Arton FLZU130DO" manufactured by JSR.) having thickness of 130 µm containing a resin in which a ring opening polymer obtained by polymerizing a norbornene-based monomer had been hydrogenated, via an acrylic resin-based pressure-sensitive adhesive layer (thickness 15 µm) used in Example 1. Thereafter, a film was retained at the machine direction with a roll stretching machine, and the film was stretched at 1.42 times at 146° C.±1° C. Properties of the resulting retardation film are as shown in Table 2.

Example 26

According to the same manner as that of Example 25 except that a stretching temperature was changed from 146° C. to 155° C., and a stretching ratio was changed from 1.42 times to 1.44 times, a retardation film was prepared. Properties of the resulting retardation film are shown in Table 2.

Example 27

According to the same manner as that of Example 25 except that a stretching ratio was changed from 1.42 times to 1.13 times, a retardation film was prepared. Properties of the resulting retardation film are shown in Table 2.

Example 28

A shrinkable film (A) was applied on both sides of a polymer film (trade name "ZEONOR ZF14-100" manufactured by Nippon Zeon Co., Ltd.) having thickness of 100 µm containing a resin in which a ring opening polymer obtained by polymerizing a norbornene-based monomer had been hydrogenated, via an acrylic resin-based pressure-sensitive adhesive layer (thickness 15 µm) used in Example 1. Thereafter, a film was retained at the machine direction with a roll stretching machine, and the film was stretched at 1.23 times at 153° C.±1° C. Properties of the resulting retardation film are as shown in Table 2.

Comparative Example 1

A shrinkable film (A) was applied on both sides of a polymer film (thickness 40 µm) containing a polycarbonate-based resin obtained by condensing phosgene and bisphenol A, via an acrylic resin-based pressure-sensitive adhesive layer. Thereafter, a film was retained at machine direction with a roll stretching machine, and the film was stretched at 1.10 times at 160° C. Properties of the resulting retardation film are as shown in Table 2. AS a biaxial stretched polypropylene film and an acrylic resin-based pressure-sensitive adhesive used in the Comparative Example, the same film and adhesive as those of Example 1 were used. A glass transition temperature (Tg) of the polymer film containing a polycarbonate-based resin was 150° C., a retardation value in film plane before stretching was 7 nm, and a retardation value in the thickness direction was 15 nm.

Comparative Example 2

According to the same manner as that of Comparative Example 1 except that thickness of a polymer film was changed from 40 µm to 60 µm, and a stretching ratio was changed from 1.10 times to 1.05 times, a retardation film was prepared. Properties of the resulting retardation film are shown in Table 2.

Figure 11:
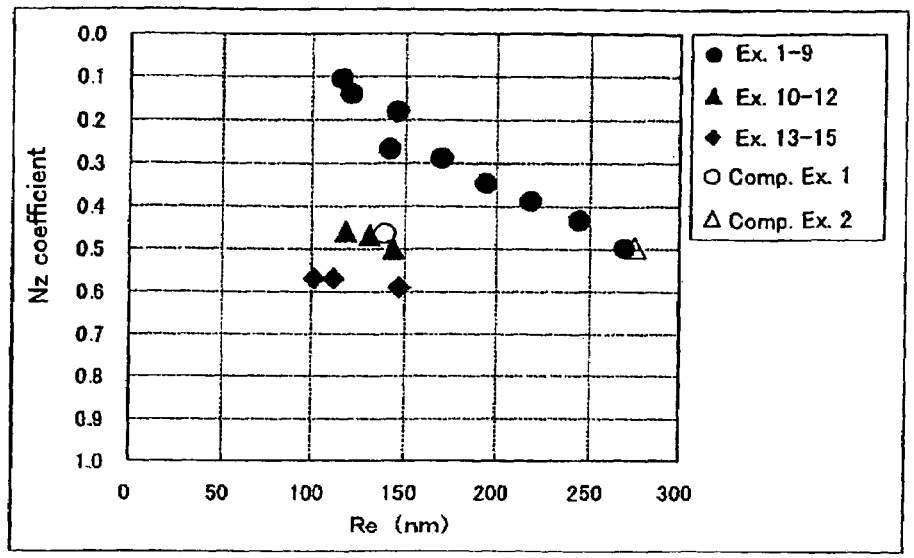
FIG. 11 is a graph showing a relationship between in plane retardation value and Nz coefficient of the retardation film of the present invention.

FIG. 11 is a graph showing a relationship between an in plane retardation value: Re (nm) of retardation films described in Examples 1 to 15 and retardation films of Comparative Examples 1 to 2 and an Nz coefficient. As shown in FIG. 11, it is seen that, in Examples 1 to 9, even when a polymer film containing a resin in which a ring opening polymer obtained by polymerizing a norbornene-based monomer is hydrogenated is used, a retardation film having a wide range of an in plane retardation value and a Nz coefficient was obtained. In addition, it is seen that in Examples 10 to 15, retardation films having an in plane retardation value and an Nz coefficient suitable as a λ/4 plate were obtained.

TABLE 2

| | Polymer film | | Kind of shrinkable film | Stretching condition | | Retardation film | | | | | | | | |
|---|---|---|---|---|---|---|---|---|---|---|---|---|---|---|
| | | Thickness (µm): before stretching | | Temperature (°C.) | ratio | Thickness (µm): after stretching | Nz coefficient | Re (nm) | Rth (nm) | R (480)/ R (590) | Light transmittance (%) | Unevenness of orientation angle | Absolute value of photoelastic coefficient (m²/N) | Display uniformity |
| Example 1 | NOR | 100 | E | 146 | 1.38 | 108 | 0.50 | 270.0 | 135.0 | 1.00 | 92.0 | ±0.7° | $3.10 \times 10^{-12}$ | ○ |
| Example 2 | NOR | 100 | E | 140 | 1.08 | 107 | 0.11 | 116.3 | 12.6 | 1.00 | 92.0 | ±0.7° | $3.10 \times 10^{-12}$ | ○ |
| Example 3 | NOR | 100 | E | 140 | 1.09 | 107 | 0.14 | 121.4 | 17.0 | 1.00 | 92.0 | ±0.7° | $3.10 \times 10^{-12}$ | ○ |
| Example 4 | NOR | 100 | E | 155 | 1.30 | 125 | 0.27 | 142.0 | 38.3 | 1.00 | 92.0 | ±0.7° | $3.10 \times 10^{-12}$ | ○ |
| Example 5 | NOR | 100 | E | 150 | 1.20 | 118 | 0.18 | 146.1 | 26.9 | 1.00 | 92.0 | ±0.7° | $3.10 \times 10^{-12}$ | ○ |
| Example 6 | NOR | 100 | E | 145 | 1.20 | 110 | 0.29 | 170.0 | 49.3 | 1.00 | 92.0 | ±0.7° | $3.10 \times 10^{-12}$ | ○ |
| Example 7 | NOR | 100 | E | 148 | 1.30 | 114 | 0.35 | 194.7 | 67.6 | 1.00 | 92.0 | ±0.7° | $3.10 \times 10^{-12}$ | ○ |
| Example 8 | NOR | 100 | E | 148 | 1.35 | 114 | 0.39 | 219.1 | 85.7 | 1.00 | 92.0 | ±0.7° | $3.10 \times 10^{-12}$ | ○ |
| Example 9 | NOR | 100 | E | 148 | 1.40 | 111 | 0.44 | 245.1 | 106.6 | 1.00 | 92.0 | ±0.7° | $3.10 \times 10^{-12}$ | ○ |
| Example 10 | NOR | 40 | E | 143 | 1.58 | 46 | 0.50 | 145.0 | 72.5 | 1.00 | 93.0 | ±0.7° | $3.10 \times 10^{-12}$ | ○ |
| Example 11 | NOR | 40 | E | 143 | 1.52 | 47 | 0.47 | 132.0 | 62.0 | 1.00 | 93.0 | ±0.7° | $3.10 \times 10^{-12}$ | ○ |
| Example 12 | NOR | 40 | E | 143 | 1.45 | 48 | 0.46 | 119.0 | 54.6 | 1.00 | 93.0 | ±0.7° | $3.10 \times 10^{-12}$ | ○ |
| Example 13 | NOR | 40 | A | 143 | 1.65 | 44 | 0.59 | 148.0 | 87.3 | 1.00 | 93.0 | ±0.7° | $3.10 \times 10^{-12}$ | ○ |
| Example 14 | NOR | 40 | A | 143 | 1.50 | 44 | 0.57 | 112.0 | 63.8 | 1.00 | 93.0 | ±0.7° | $3.10 \times 10^{-12}$ | ○ |
| Example 15 | NOR | 40 | A | 143 | 1.40 | 44 | 0.57 | 102.0 | 58.1 | 1.00 | 93.0 | ±0.7° | $3.10 \times 10^{-12}$ | ○ |
| Example 16 | NOR | 130 | C | 146 | 1.42 | 143 | 0.51 | 269.0 | 137.0 | 1.00 | 91.5 | ±0.7° | $5.20 \times 10^{-12}$ | ○ |

TABLE 2-continued

|  | Polymer film | | Stretching | | | Retardation film | | | | | | | |
|---|---|---|---|---|---|---|---|---|---|---|---|---|---|
|  |  | Thickness (μm): before stretching | Kind of shrinkable film | condition | | Thickness (μm): after stretching | Nz coefficient | Re (nm) | Rth (nm) | R (480)/ R (590) | Light transmittance (%) | Unevenness of orientation angle | Absolute value of photoelastic coefficient (m²/N) | Display uniformity |
|  |  |  |  | Temperature (°C.) | ratio |  |  |  |  |  |  |  |  |  |
| Example 17 | NOR | 130 | F | 146 | 1.37 | 145 | 0.48 | 270.0 | 130.0 | 1.00 | 91.5 | ±0.7° | $5.20 \times 10^{-12}$ | ○ |
| Example 18 | NOR | 130 | F | 146 | 1.26 | 147 | 0.41 | 199.0 | 82.0 | 1.00 | 91.5 | ±0.7° | $5.20 \times 10^{-12}$ | ○ |
| Example 19 | NOR | 130 | D | 146 | 1.39 | 143 | 0.51 | 273.0 | 139.0 | 1.00 | 91.5 | ±0.7° | $5.20 \times 10^{-12}$ | ○ |
| Example 20 | NOR | 130 | D | 148 | 1.26 | 150 | 0.40 | 179.0 | 72.0 | 1.00 | 91.5 | ±0.7° | $5.20 \times 10^{-12}$ | ○ |
| Example 21 | NOR | 130 | D | 146 | 1.43 | 144 | 0.52 | 288.0 | 150.0 | 1.00 | 91.5 | ±0.7° | $5.20 \times 10^{-12}$ | ○ |
| Example 22 | NOR | 100 | C | 146 | 1.39 | 108 | 0.46 | 269.0 | 124.0 | 1.00 | 92.0 | ±0.7° | $3.10 \times 10^{-12}$ | ○ |
| Example 23 | NOR | 100 | C | 150 | 1.32 | 117 | 0.33 | 179.0 | 59.0 | 1.00 | 92.0 | ±0.7° | $3.10 \times 10^{-12}$ | ○ |
| Example 24 | NOR | 100 | C | 149 | 1.35 | 115 | 0.37 | 201.0 | 74.0 | 1.00 | 92.0 | ±0.7° | $3.10 \times 10^{-12}$ | ○ |
| Example 25 | NOR | 130 | B | 146 | 1.42 | 141 | 0.60 | 271.0 | 163.0 | 1.00 | 91.5 | ±0.7° | $5.20 \times 10^{-12}$ | ○ |
| Example 26 | NOR | 130 | B | 155 | 1.44 | 142 | 0.48 | 200.0 | 96.0 | 1.00 | 91.5 | ±0.7° | $5.20 \times 10^{-12}$ | ○ |
| Example 27 | NOR | 130 | B | 146 | 1.13 | 145 | 0.42 | 108.0 | 45.0 | 1.00 | 91.5 | ±0.7° | $5.20 \times 10^{-12}$ | ○ |
| Example 28 | NOR | 100 | A | 153 | 1.23 | 121 | 0.30 | 130.0 | 39.0 | 1.00 | 92.0 | ±0.7° | $3.10 \times 10^{-12}$ | ○ |
| Comparative Example 1 | PC | 40 | A | 160 | 1.05 | 45 | 0.46 | 140.0 | 65.0 | 1.05 | 93.0 | ±0.7° | $1.00 \times 10^{-10}$ | x |
| Comparative Example 2 | PC | 60 | A | 160 | 1.10 | 71 | 0.50 | 276.0 | 137.0 | 1.05 | 93.0 | ±0.7° | $1.00 \times 10^{-10}$ | x |

In Table 2, NOR is a resin in which a ring opening polymer obtained by polymerizing a norbornene-based monomer has been hydrogenated, and PC is a polycarbonate-based resin.

Example 1-1

[Preparation of Polarizing Plate (P1)]

A polyvinyl alcohol film was dyed with an aqueous solution containing iodine, and uniaxial stretched between rolls having different rate ratios in an aqueous solution containing boric acid to obtain a polarizer. An unstretched polymer film (trade name "ZEONOR ZF14-040" manufactured by Nippon Zeon Co., Ltd., the photoelastic coefficient (absolute value) $3.01 \times 10^{-12}$ m²/N) having thickness of 40 μm containing a resin in which a ring opening polymer obtained by polymerizing an norbornene-based monomer had been hydrogenated was adhered on one side of the polarizer via a polyvinyl alcohol-based adhesive (trade name "Gosephymer Z" manufactured by The Nippon Synthetic Chemical Industries Co., Ltd.) after thin coating of an adhesive undercoating agent (trade name "A-1110" manufactured by Nippon Unicar Company Limited) on an adhesive surface, and a 40 μm thick triacetylcellulose film (trade name "Fujitack" manufactured by Fuji Photo Film Co., Ltd.) was adhered on other surface of the polarizer via the aforementioned polyvinyl alcohol-based adhesive to obtain a polarizing plate (P1). The polymer film containing a resin in which a ring opening polymer obtained by polymerizing a norbornene-based monomer had been hydrogenated had an in plane retardation (Re) of 1.0 nm, and a retardation (Rth) in the thickness direction of 3.0 nm.

[Preparation of Optical Film (Q1)]

The retardation film obtained in Example 1 was adhered on a surface of the polymer film containing a resin in which a ring opening polymer obtained by polymerizing a norbornene-based monomer had been hydrogenated, of the polarizing plate (P1) via an acrylic resin-based pressure-sensitive adhesive so that the slow axis of the retardation film became parallel (0°±1.0°) with the absorption axis of the polarizer, to obtain an optical film (Q1).

[Preparation of Liquid Crystal Display]

A liquid crystal panel was removed from a liquid crystal display [KLV-17HR2 manufactured by SONY] containing an IPS mode liquid crystal cell, polarizing plates arranged on and under the liquid crystal cell were removed, and a glass surface thereof (front and back) was washed. Subsequently, the optical film (Q1) was adhered on a viewing side of the liquid crystal cell via an acrylic resin-based pressure-sensitive adhesive so that the absorption axis of a polarizer of an optical film (Q1) became parallel to a long side of the liquid crystal cell. On the other hand, the polarizing plate (P1) was adhered on a backlight side of the liquid crystal cell via an acrylic resin-based pressure-sensitive adhesive so that the absorption axis of a polarizer of the polarizing plate (P1) became perpendicular to a long side of the liquid crystal cell, to prepare a liquid crystal panel (I). The optical film (Q1) was arranged so that the retardation film was on a side near the liquid crystal cell. In addition, the polarizing plate (P1) was arranged so that the polymer film containing a resin in which a ring opening polymer obtained by polymerizing a norbornene-based monomer had been hydrogenated was on a side near the liquid crystal cell.

Figure 12:
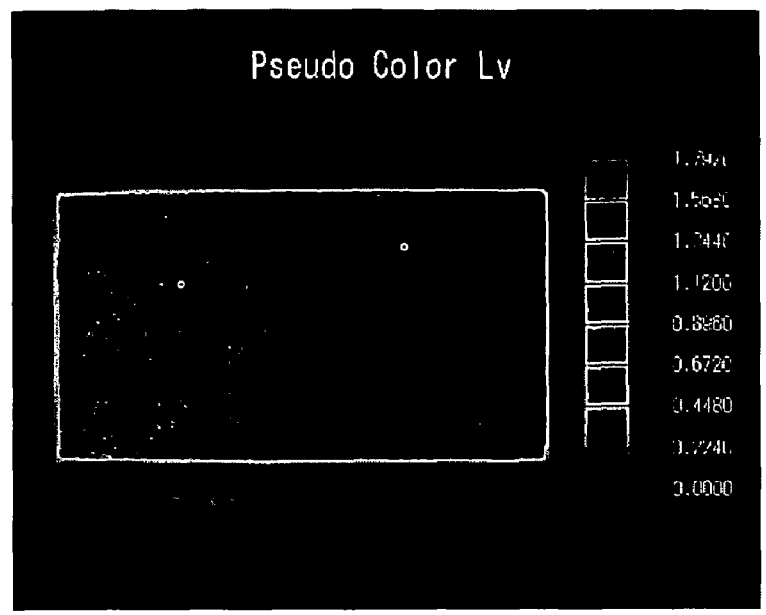
FIG. 12 is a photograph showing a viewing unevenness of the liquid crystal panel of Example 1-1.

The liquid crystal panel (I) was incorporated into an original liquid crystal display. Regarding the resulting liquid crystal display, backlight was switched on for 8 hours, and a display screen of the liquid crystal display was photographed in a dark chamber using a two-dimensional color distribution measuring apparatus "CA-1500" manufactured by MINOLTA. As a result, as shown in FIG. 12, a viewing unevenness due to heat of backlight was small.

In addition, the thus prepared liquid crystal panel (I) was connected to a backlight unit to prepare a liquid crystal display (I). A contrast ratio at an azimuthally angle of 45° and a polar angle of 60° was measured after backlight was turned on for 30 minutes, and a contrast ratio was found to be 75.

Comparative Example 2-1

Figure 13:
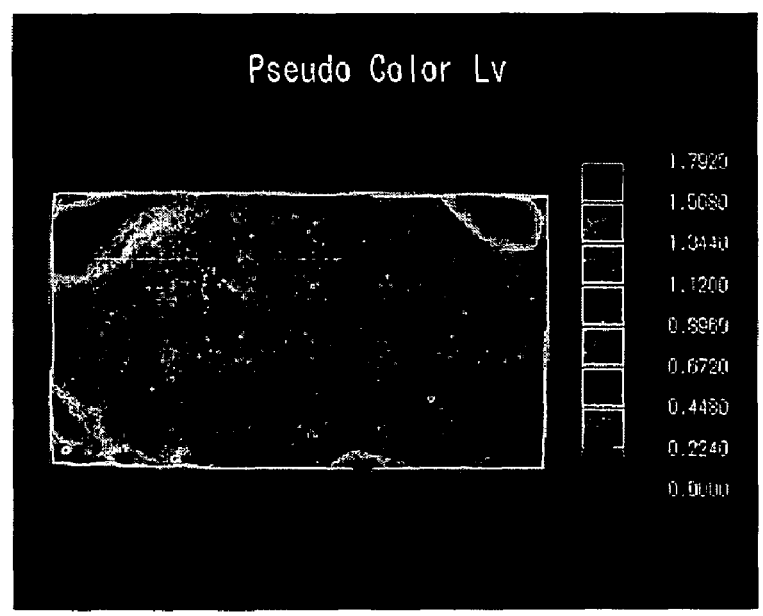
FIG. 13 is a photograph showing a viewing unevenness of the liquid crystal panel of Comparative Example 2-1.

According to the same manner as that of Example 1-1 except that the retardation film obtained in Comparative Example 2 was used in place of the retardation film obtained in Example 1 in Example 1-1, a liquid crystal panel (I') was prepared. As in Example 1-1, this was incorporated into a liquid crystal display [KLV-17HR2 manufactured by SONY] to obtain a liquid crystal display. After backlight of a liquid crystal display was turned on for 8 hours, and a display screen was photographed according to the same manner as that of Example 1-1. As a result, as shown in FIG. 13, a viewing unevenness due to heat of backlight was very large.

As shown in FIG. 12, the liquid crystal display in which a liquid crystal panel using the retardation film described in Example 1 was incorporated had a small viewing unevenness due to heat of backlight. Regarding Examples 2 to 28, assessment was performed as in Example 1, and a viewing unevenness was small. In the case other than Examples 8, 9, 16, 17, 19, 21, 22, 24 and 25, two retardation films were used so that the slow axis became parallel to each other. As shown in FIG. 13, in a liquid crystal display in which a liquid crystal panel using a retardation film obtained by the prior art shown in Comparative Example 2 was incorporated, a viewing unevenness due to heat of backlight was very large. When Comparative Example 1 was assessed as in Comparative Example 2, a viewing unevenness was very large. In Comparative Example 1, two retardation films were used so that the slow axis became parallel to each other.

Example 23-1

[Preparation of Polarizing Plate (P2)]

A polyvinyl alcohol film was dyed in an aqueous solution containing iodine, and uneasily stretched between rolls having different rate ratios in an aqueous solution containing boric acid to obtain a polarizer (thickness 28 μm, polymerization degree 99.9%, and single transmittance 43.5%). A triacetylcellulose film (trade name "Jettack" manufactured by Fuji Photo Film Co., Ltd., in plane retardation (Re) is 1.0 nm, retardation (Rth) in the thickness direction is 4.0 nm) having thickness of 80 μm was adhered on one side of the polarizer via a polyvinyl alcohol-based adhesive (trade name "Gosethymer Z" manufactured by The Nippon Synthetic Chemical Industries Co., Ltd.), to obtain a polarizing plate (P2).

[Preparation of Optical Film (Q2)]

The retardation film obtained in Example 23 was adhered on a surface of a triacetylcellulose film of the polarizing plate (P2) via an acrylic resin-based pressure-sensitive adhesive so that the slow axis of the retardation film became perpendicular (90°±0.5°) to the absorption axis of the polarizer, to obtain an optical film (Q2).

[Preparation of Liquid Crystal Display (II)]

A liquid crystal panel was removed from a liquid crystal display [KLV-17HR2 manufactured by SONY] containing an ITS mode liquid crystal cell, and polarizing plates arranged on and under the liquid crystal cell were removed, and a glass surface (front and back) thereof was washed. Subsequently, the optical film (Q2) was adhered on a viewing side of the liquid crystal cell via an acrylic resin-based pressure-sensitive adhesive so that the absorption axis of a polarizer of the optical film (Q2) became parallel to a long side of the liquid crystal cell. On the other hand, the polarizing plate (P2) was adhered on a backlight side of the liquid crystal cell via an acrylic resin-based pressure-sensitive adhesive so that the absorption axis of a polarizer of the polarizing plate (P2) became perpendicular to a long side of the liquid crystal cell, to prepare a liquid crystal panel (II). The optical film (Q2) was arranged so that the retardation film was on a side near the liquid crystal cell. The thus prepared liquid crystal panel (II) was connected to a backlight unit to prepare a liquid crystal display (II). A contrast ratio at an azimuthally angle of 45° and a polar angle of 60° was measured after backlight was turned on for 30 minutes, and a contrast ratio was found to be 60.

Example 23-2

[Preparation of Polarizing Plate (P3)]

A polyvinyl alcohol film was dyed in an aqueous solution containing iodine, and uneasily stretched between rolls having different rate ratios in an aqueous solution containing boric acid to obtain a polarizer (thickness 28 μm, polymerization degree 99.9%, and single transmittance 43.5%). A triacetylcellulose film (trade name "Fujitack" manufactured by Fuji Photo Film Co., Ltd., in plane retardation (Re) is 1.0 nm, retardation (Rth) in the thickness direction is 58.3 nm) having thickness of 80 μm was adhered on one side of the polarizer via a polyvinyl alcohol-based adhesive (trade name "Gosethymer Z" manufactured by The Nippon Synthetic Chemical Industries Co., Ltd.), to obtain a polarizing plate (P3).

[Preparation of Optical Film (Q3)]

The retardation film obtained in Example 23 was adhered on a surface of a triacetylcellulose film of the polarizing plate (P3) via an acrylic resin-based pressure-sensitive adhesive so that the slow axis of the retardation film became perpendicular (90°±0.5°) to the absorption axis of the polarizer, to obtain an optical film (Q3).

[Preparation of Liquid Crystal Display (III)]

A liquid crystal panel was removed from a liquid crystal display [KLV-17HR2 manufactured by SONY] containing an ITS mode liquid crystal cell, and polarizing plates arranged on and under the liquid crystal cell were removed, and a glass surface (front and back) thereof was washed. Subsequently, the optical film (Q3) was adhered on a backlight side of the liquid crystal cell via an acrylic resin-based pressure-sensitive adhesive so that the absorption axis of a polarizer of the optical film (Q3) became perpendicular to a long side of the liquid crystal cell. On the other hand, the polarizing plate (P3) was adhered on a viewing side of the liquid crystal cell via an acrylic resin-based pressure-sensitive adhesive so that the absorption axis of a polarizer of the polarizing plate (P3) became parallel to a long side of the liquid crystal cell, to prepare a liquid crystal panel (III). The optical film (Q3) was arranged so that the retardation film was on a side near the liquid crystal cell. The thus prepared liquid crystal panel (III) was connected to a backlight unit to prepare a liquid crystal display (III). A contrast ratio at an azimuthally angle of 45° and a polar angle of 60° was measured after backlight was turned on for 30 minutes, and a contrast ratio was found to be 45.

Example 24-1

[Preparation of Polarizing Plate (P4)]

A polyvinyl alcohol film was dyed in an aqueous solution containing iodine, and uneasily stretched between rolls having different rate ratios in an aqueous solution containing boric acid to obtain a polarizer (thickness 28 μm, polymerization degree 99.9%, and single transmittance 43.5%). A triacetylcellulose film (trade name "Fujitack" manufactured by Fuji Photo Film Co., Ltd., in plane retardation (Re) is 0.5 nm, retardation (Rth) in the thickness direction is 40.0 nm) having thickness of 80 μm was adhered on one side of the polarizer via a polyvinyl alcohol-based adhesive (trade name "Gosethymer Z" manufactured by The Nippon Synthetic Chemical Industries Co., Ltd.), to obtain a polarizing plate (P4).

[Preparation of Optical Film (Q4)]

The retardation film obtained in Example 24 was adhered on a surface of a triacetylcellulose film of the polarizing plate (P4) via an acrylic resin-based pressure-sensitive adhesive so that the slow axis of the retardation film became perpendicular (90°±0.5°) to the absorption axis of the polarizer, to obtain an optical film (Q4).

[Preparation of Liquid Crystal Display (IV)]

A liquid crystal panel was removed from a liquid crystal display [KLV-17HR2 manufactured by SONY] containing an ITS mode liquid crystal cell, and polarizing plates arranged on and under the liquid crystal cell were removed, and a glass surface (front and back) thereof was washed. Subsequently, the optical film (Q4) was adhered on a viewing side of the liquid crystal cell via an acrylic resin-based pressure-sensitive adhesive so that the absorption axis of a polarizer of the optical film (Q4) became parallel to a long side of the liquid crystal cell. On the other hand, the polarizing plate (P2) prepared in Example 23-1 was adhered on a backlight side of the liquid crystal cell via an acrylic resin-based pressure-sensitive adhesive so that the absorption axis of a polarizer of the polarizing plate (P2) became perpendicular to a long side of the liquid crystal cell, to prepare a liquid crystal panel (IV). The optical film (Q4) was arranged so that the retardation film was on a side near the liquid crystal cell. The thus prepared liquid crystal panel (IV) was connected to a backlight unit to prepare a liquid crystal display (IV). A contrast ratio at an azimuthally angle of 45° and a polar angle of 60° was measured after backlight was turned on for 30 minutes, and a contrast ratio was found to be 60.

Example 27-1

[Preparation of Optical Film (Q5)]

The retardation film obtained in Example 27 was adhered on a surface of a triacetylcellulose film of the polarizing plate (P3) via an acrylic resin-based pressure-sensitive adhesive so that the slow axis of the retardation film became perpendicular (90°±0.5°) to the absorption axis of the polarizer, to obtain an optical film (Q5).

[Preparation of Liquid Crystal Display (V)]

A liquid crystal panel was removed from a liquid crystal display [KLV-17HR2 manufactured by SONY] containing an ITS mode liquid crystal cell, and polarizing plates arranged on and under the liquid crystal cell were removed, and a glass surface (front and back) thereof-was washed. Subsequently, the optical film (Q5) was adhered on a backlight side of the liquid crystal cell via an acrylic resin-based pressure-sensitive adhesive so that the absorption axis of a polarizer of the optical film (Q5) became perpendicular to a long side of the liquid crystal cell. On the other hand, the polarizing plate (P3) was adhered on a viewing side of the liquid crystal cell via an acrylic resin-based pressure-sensitive adhesive so that the absorption axis of a polarizer of the polarizing plate (P3) became parallel to a long side of the liquid crystal cell, to prepare a liquid crystal panel (V). The optical film (Q5) was arranged so that the retardation film was on a side near the liquid crystal cell. The thus prepared liquid crystal panel (V) was connected to a backlight unit to prepare a liquid crystal display (V). A contrast ratio at an azimuthally angle of 45° and a polar angle of 60° was measured after backlight was turned on for 30 minutes, and a contrast ratio was found to be 50.

Example 28-1

[Preparation of Optical Film (Q6)]

The retardation film obtained in Example 24 was adhered on a surface of a triacetylcellulose film of the polarizing plate (P3) via an acrylic resin-based pressure-sensitive adhesive so that the slow axis of the retardation film became perpendicular (90°±0.5°) to the absorption axis of the polarizer, to obtain an optical film (Q6).

[Preparation of Liquid Crystal Display (VI)]

A liquid crystal panel was removed from a liquid crystal display [KLV-17HR2 manufactured by SONY] containing an ITS mode liquid crystal cell, and polarizing plates arranged on and under the liquid crystal cell were removed, and a glass surface (front and back) thereof was washed. Subsequently, the optical film (Q6) was adhered on a viewing side of the liquid crystal cell via an acrylic resin-based pressure-sensitive adhesive so that the absorption axis of a polarizer of the optical film (Q6) became parallel to a long side of the liquid crystal cell. On the other hand, the polarizing plate (P3) was adhered on a backlight side of the liquid crystal cell via an acrylic resin-based pressure-sensitive adhesive so that the absorption axis of a polarizer of the polarizing plate (P3) became perpendicular to a long side of the liquid crystal cell, to prepare a liquid crystal panel (VI). The optical film (Q6) was arranged so that the retardation film was on a side near the liquid crystal cell. The thus prepared liquid crystal panel (VI) was connected to a backlight unit to prepare a liquid crystal display (VI). A contrast ratio at an azimuthally angle of 45° and a polar angle of 60° was measured after backlight was turned on for 30 minutes, and a contrast ratio was found to be 40.

Comparative Example 3

[Preparation of Liquid Crystal Display (VII)]

A liquid crystal panel was removed from a liquid crystal display [KLV-17HR2 manufactured by SONY] containing an ITS mode liquid crystal cell, and polarizing plates arranged on and under the liquid crystal cell were removed, and a glass surface (front and back) thereof was washed. Subsequently, the polarizing plate (P3) was adhered on a viewing side of the liquid crystal cell via an acrylic resin-based pressure-sensitive adhesive so that the absorption axis of a polarizer of the polarizing plate (P3) became parallel to a long side of the liquid crystal cell. On the other hand, the polarizing plate (P3) was adhered on a backlight side of the liquid crystal cell via an acrylic resin-based pressure-sensitive adhesive so that the absorption axis of a polarizer of the polarizing plate (P3) became perpendicular to a long side of the liquid crystal cell, to prepare a liquid crystal panel (VII). The thus prepared liquid crystal panel (VII) was connected to a backlight unit to prepare a liquid crystal display (VII). A contrast ratio at an azimuthally angle of 45° and a polar angle of 60° was measured after backlight was turned on for 30 minutes, and a contrast ratio was found to be 10.

INDUSTRIAL APPLICABILITY

According to the retardation film of the present invention, since a retardation film which does not generate a shift or a unevenness of a retardation value due to a stress even using in a liquid crystal display, has a relationship of nx>nx>ny, and has a wide range of a retardation value can be provided, it can be said that the present invention is extremely useful for improving a display property of liquid crystal display.

What is claimed is:

1. A process for producing a retardation film comprising a stretched film of a polymer film containing a norbornene-based resin, wherein the stretched film satisfies the following equation (1) and the equation (2);

$$100 \text{ nm} \leq (nx-ny)d \leq 350 \text{ nm} \quad (1)$$

$$0.45 < (nx-nz)/(nx-ny) \leq 0.6 \quad (2)$$

where the refractive indices in the slow axis direction, the fast axis direction and the thickness direction of the film are nx, ny and nz, respectively, d(nm) is thickness of the film, and the slow axis direction is a direction that the refractive index in film plane is maximum, said process comprising steps of:

applying a shrinkable film on one side or both sides of a polymer film containing a norbornene-based resin, and heat-stretching the polymer film so that the stretched film satisfies the following equation (1) and the equation (2);

$$100 \text{ nm} \leq (nx-ny)d \leq 350 \text{ nm} \quad (1)$$

$$0.45 < (nx-nz)/(nx-ny) \leq 0.6 \quad (2)$$

where the refractive indices in the slow axis direction, the fast axis direction and the thickness direction of the film are nx, ny and nz, respectively, d(nm) is thickness of the film, and the slow axis direction is a direction that the refractive index in film plane is maximum, wherein an absolute value of photoelastic coefficient of the retardation film at 23° C. is from $1.0 \times 10^{-12}$ $m^2/N$ to $12.0 \times 10^{-12}$ $m^2/N$.

2. The process for producing a retardation film according to claim 1, wherein a thickness of the polymer film is from 10 to 500 μm.

3. The process for producing a retardation film according to claim 1, wherein a stretching temperature of the polymer film is from Tg+1° C. to Tg+30° C. of the polymer film.

4. The process for producing a retardation film according to claim 1, wherein a stretching ratio of the polymer film is from 1.05 to 3 times.

5. The process for producing a retardation film according to claim 1, wherein the shrinkable film has a shrinkage percentage in the machine direction at 140° C., which is expressed by $S^{140}$ (MD), of from 4 to 20%, and a shrinkage percentage in the transverse direction at 140° C., which is expressed by $S^{140}$ (TD), of from 4 to 30%.

6. The process for producing a retardation film according to claim 1, wherein the shrinkable film has a shrinkage percentage in the machine direction at 160° C., which is expressed by $S^{160}$ (MD), of from 10 to 30%, and a shrinkage percentage in the transverse direction at 160° C., which is expressed by $S^{160}$ (TD), of from 32 to 65%.

7. The process for producing a retardation film according to claim 1, wherein a difference in the shrinkable film between a shrinkage percentage in the transverse direction at 140° C., which is expressed by $S^{140}$ (TD), and a shrinkage percentage in the machine direction at 140° C., which is expressed by $S^{140}$ (MD), that is expressed by $\Delta S^{140} = S^{140}$ (TD) $- S^{140}$ (MD) is in a range of $0.5\% \leq \Delta S^{140} \leq 10\%$.

8. The process for producing a retardation film according to claim 1, wherein a difference in the shrinkable film between a shrinkage percentage in the transverse direction at 160° C., which is expressed by $S^{160}$ (TD), and a shrinkage percentage in the machine direction at 160° C., which is expressed by $S^{160}$ (MD), that is expressed by $\Delta S^{160} = S^{160}$ (TD) $- S^{160}$ (MD) is in a range of $5\% \Delta S^{160} \leq 50\%$.

9. The process for producing a retardation film according to claim 1, wherein the shrinkable film has a shrinking stress in the transverse direction at 140° C., which is expressed by $T^{140}$ (TD), of from 0.2 to 1.2 N/2 mm.

10. The process for producing a retardation film according to claim 1, wherein the shrinkable film has a shrinking stress in the transverse direction at 150° C., which is expressed by $T^{150}$ (TD), of from 0.3 to 1.3 N/2 mm.

11. The process for producing a retardation film according to claim 1, wherein the shrinkable film is a biaxial stretched polypropylene film.

* * * * *